(12) United States Patent
Yiu et al.

(10) Patent No.: US 9,591,581 B2
(45) Date of Patent: Mar. 7, 2017

(54) RSRP MOBILITY STATE ESTIMATION FOR CELLULAR DEVICE

(71) Applicant: Intel Corporation, Santa Clara, CA (US)

(72) Inventors: Candy Yiu, Portland, OR (US); Chia-Yang Chiang, Hillsboro, OR (US); Yujian Zhang, Beijing (CN); Youn Hyoung Heo, Seoul (KR); Mo-Han Fong, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/127,830

(22) PCT Filed: Sep. 27, 2013

(86) PCT No.: PCT/US2013/062427
§ 371 (c)(1),
(2) Date: Dec. 19, 2013

(87) PCT Pub. No.: WO2014/052905
PCT Pub. Date: Apr. 3, 2014

(65) Prior Publication Data
US 2015/0223050 A1    Aug. 6, 2015

Related U.S. Application Data

(60) Provisional application No. 61/707,784, filed on Sep. 28, 2012.

(51) Int. Cl.
*H04W 36/00* (2009.01)
*H04W 52/02* (2009.01)
(Continued)

(52) U.S. Cl.
CPC .......... *H04W 52/0258* (2013.01); *H04B 5/00* (2013.01); *H04B 17/318* (2015.01);
(Continued)

(58) Field of Classification Search
CPC . H04W 24/10; H04W 52/0245; H04W 72/08; H04W 52/245; H04W 36/32;
(Continued)

(56) References Cited

U.S. PATENT DOCUMENTS 7,461,253 B2    12/2008    Braskich et al.
8,976,954 B1    3/2015    Williams et al.
(Continued)

FOREIGN PATENT DOCUMENTS

BE    1020890 A5    7/2014
CN    103581880 A    2/2014
(Continued)

OTHER PUBLICATIONS

"U.S. Appl. No. 13/706,098, Examiner Interview Summary mailed Oct. 28, 2015", 3 pgs.
(Continued)

*Primary Examiner* — Marcus Hammonds
(74) *Attorney, Agent, or Firm* — Schwegman Lundberg & Woessner, P.A.

(57) ABSTRACT

Generally discussed herein are systems and apparatuses that can implement a Mobility State Estimation (MSE) of a User Equipment (UE) and techniques for using the MSE algorithms. According to an example technique to determine the MSE of a UE can include determining, using the UE, a maximum Reference Signal Received Power (RSRP) within a cell, determining, using the UE, a minimum RSRP within the cell, determining, using the UE, a difference between the
(Continued)

maximum and minimum RSRP, and determining, using the UE, an MSE of the UE as a function of the determined difference.

20 Claims, 14 Drawing Sheets

(51) Int. Cl.

| | |
|---|---|
| H04W 72/04 | (2009.01) |
| H04W 72/12 | (2009.01) |
| H04W 74/00 | (2009.01) |
| H04L 5/00 | (2006.01) |
| H04L 1/18 | (2006.01) |
| H04W 48/14 | (2009.01) |
| H04W 72/02 | (2009.01) |
| H04W 76/02 | (2009.01) |
| H04W 88/02 | (2009.01) |
| H04B 17/318 | (2015.01) |
| H04W 24/10 | (2009.01) |
| H04W 76/04 | (2009.01) |
| H04W 4/00 | (2009.01) |
| H04W 24/08 | (2009.01) |
| H04W 28/02 | (2009.01) |
| H04W 40/24 | (2009.01) |
| H04W 48/16 | (2009.01) |
| H04W 52/04 | (2009.01) |
| H04W 52/14 | (2009.01) |
| H04B 5/00 | (2006.01) |
| H04J 3/16 | (2006.01) |
| H04L 5/14 | (2006.01) |
| H04L 29/06 | (2006.01) |
| H04L 29/08 | (2006.01) |
| H04W 8/08 | (2009.01) |
| H04W 28/08 | (2009.01) |
| H04W 36/22 | (2009.01) |
| H04W 48/20 | (2009.01) |
| H04L 12/24 | (2006.01) |
| H04W 28/16 | (2009.01) |
| H04J 11/00 | (2006.01) |
| H04W 72/00 | (2009.01) |
| H04W 80/10 | (2009.01) |
| H04W 36/08 | (2009.01) |
| H04W 48/18 | (2009.01) |
| H04W 88/18 | (2009.01) |

(52) U.S. Cl.
CPC ......... *H04J 3/1694* (2013.01); *H04J 11/0086* (2013.01); *H04L 1/1812* (2013.01); *H04L 1/1864* (2013.01); *H04L 5/0035* (2013.01); *H04L 5/0055* (2013.01); *H04L 5/0057* (2013.01); *H04L 5/0073* (2013.01); *H04L 5/14* (2013.01); *H04L 41/5032* (2013.01); *H04L 65/4084* (2013.01); *H04L 65/60* (2013.01); *H04L 65/602* (2013.01); *H04L 65/608* (2013.01); *H04L 67/10* (2013.01); *H04W 4/005* (2013.01); *H04W 8/08* (2013.01); *H04W 24/08* (2013.01); *H04W 24/10* (2013.01); *H04W 28/0215* (2013.01); *H04W 28/0221* (2013.01); *H04W 28/08* (2013.01); *H04W 28/16* (2013.01); *H04W 36/0061* (2013.01); *H04W 36/0083* (2013.01); *H04W 36/0088* (2013.01); *H04W 36/22* (2013.01); *H04W 40/246* (2013.01); *H04W 48/14* (2013.01); *H04W 48/16* (2013.01); *H04W 48/20* (2013.01); *H04W 52/0209* (2013.01); *H04W 52/0212* (2013.01); *H04W 52/0235* (2013.01); *H04W 52/04* (2013.01); *H04W 52/14* (2013.01); *H04W 72/02* (2013.01); *H04W 72/042* (2013.01); *H04W 72/044* (2013.01); *H04W 72/0406* (2013.01); *H04W 72/0413* (2013.01); *H04W 72/0486* (2013.01); *H04W 72/1284* (2013.01); *H04W 74/002* (2013.01); *H04W 74/004* (2013.01); *H04W 76/022* (2013.01); *H04W 76/025* (2013.01); *H04W 76/043* (2013.01); *H04W 76/046* (2013.01); *H04W 76/048* (2013.01); *H04W 88/02* (2013.01); *H04L 5/001* (2013.01); *H04W 36/08* (2013.01); *H04W 48/18* (2013.01); *H04W 52/0261* (2013.01); *H04W 72/005* (2013.01); *H04W 80/10* (2013.01); *H04W 88/18* (2013.01); *Y02B 60/50* (2013.01)

(58) Field of Classification Search
CPC . H04W 64/006; H04W 8/02; H04W 36/0083; H04B 17/318; H04L 43/08
USPC .......................................................... 455/434
See application file for complete search history.

(56) References Cited

U.S. PATENT DOCUMENTS

| | | | |
|---|---|---|---|
| 8,989,114 | B2 | 3/2015 | Kim et al. |
| 9,288,756 | B2 | 3/2016 | Stojanovski et al. |
| 9,332,456 | B2 | 5/2016 | Heo et al. |
| 9,374,806 | B2 | 6/2016 | Han et al. |
| 2002/0184373 | A1 | 12/2002 | Maes |
| 2003/0056093 | A1 | 3/2003 | Huitema et al. |
| 2004/0039906 | A1 | 2/2004 | Oka et al. |
| 2006/0031378 | A1 | 2/2006 | Vallapureddy et al. |
| 2007/0003062 | A1 | 1/2007 | Mizikovsky et al. |
| 2007/0081494 | A1 | 4/2007 | Petrescu et al. |
| 2007/0091889 | A1 | 4/2007 | Xiao et al. |
| 2007/0109989 | A1 | 5/2007 | Nakagawa et al. |
| 2008/0005568 | A1 | 1/2008 | Watson et al. |
| 2008/0183339 | A1 | 7/2008 | Vaswani et al. |
| 2009/0181670 | A1 | 7/2009 | Tseng |
| 2009/0264124 | A1 | 10/2009 | Rofougaran |
| 2009/0265542 | A1 | 10/2009 | Khetawat et al. |
| 2010/0110896 | A1 | 5/2010 | Tseng et al. |
| 2010/0110897 | A1 | 5/2010 | Chun et al. |
| 2010/0272018 | A1 | 10/2010 | Furueda et al. |
| 2010/0285810 | A1 | 11/2010 | Ko et al. |
| 2010/0303039 | A1 | 12/2010 | Zhang et al. |
| 2010/0317343 | A1 | 12/2010 | Krishnamurthy et al. |
| 2011/0002281 | A1 | 1/2011 | Terry et al. |
| 2011/0026504 | A1 | 2/2011 | Feinberg |
| 2011/0078438 | A1 | 3/2011 | Tie et al. |
| 2011/0086652 | A1 | 4/2011 | So et al. |
| 2011/0116415 | A1 | 5/2011 | Naito et al. |
| 2011/0143796 | A1 | 6/2011 | Lee et al. |
| 2011/0170427 | A1 | 7/2011 | Koivisto et al. |
| 2011/0201275 | A1 | 8/2011 | Jabara et al. |
| 2011/0222466 | A1 | 9/2011 | Pance et al. |
| 2011/0269449 | A1 | 11/2011 | Kazmi et al. |
| 2011/0270984 | A1 | 11/2011 | Park |
| 2011/0271334 | A1 | 11/2011 | Yang et al. |
| 2011/0292912 | A1 | 12/2011 | Zembutsu et al. |
| 2011/0305223 | A1 | 12/2011 | Koo et al. |
| 2012/0002537 | A1 | 1/2012 | Bao et al. |
| 2012/0044808 | A1 | 2/2012 | Song |
| 2012/0064932 | A1 | 3/2012 | Lim et al. |
| 2012/0113816 | A1 | 5/2012 | Bhattad et al. |
| 2012/0120789 | A1 | 5/2012 | Ramachandran et al. |
| 2012/0120828 | A1 | 5/2012 | Anderson et al. |
| 2012/0144226 | A1 | 6/2012 | Yang et al. |
| 2012/0155643 | A1 | 6/2012 | Hassan et al. |
| 2012/0165034 | A1 | 6/2012 | Boudreau et al. |
| 2012/0176884 | A1 | 7/2012 | Zhang et al. |
| 2012/0213261 | A1 | 8/2012 | Sayana et al. |

(56) References Cited

U.S. PATENT DOCUMENTS

| | | |
|---|---|---|
| 2012/0220327 A1 | 8/2012 | Lee et al. |
| 2012/0281643 A1 | 11/2012 | Sun et al. |
| 2012/0282966 A1 | 11/2012 | Koo et al. |
| 2013/0024684 A1 | 1/2013 | Chunduri et al. |
| 2013/0100871 A1 | 4/2013 | Vujcic |
| 2013/0121220 A1 | 5/2013 | Virtej et al. |
| 2013/0172036 A1 | 7/2013 | Miklos et al. |
| 2013/0188558 A1 | 7/2013 | Nam et al. |
| 2013/0194931 A1 | 8/2013 | Lee et al. |
| 2013/0196675 A1 | 8/2013 | Xiao et al. |
| 2013/0208604 A1 | 8/2013 | Lee et al. |
| 2013/0242897 A1 | 9/2013 | Meylan et al. |
| 2013/0244676 A1 | 9/2013 | Koivisto et al. |
| 2013/0279437 A1 | 10/2013 | Ng et al. |
| 2013/0322235 A1 | 12/2013 | Khoryaev et al. |
| 2014/0003375 A1 | 1/2014 | Nam et al. |
| 2014/0022988 A1 | 1/2014 | Davydov et al. |
| 2014/0036796 A1 | 2/2014 | Etemad et al. |
| 2014/0092828 A1 | 4/2014 | Sirotkin |
| 2014/0092833 A1 | 4/2014 | Vannithamby et al. |
| 2014/0092878 A1 | 4/2014 | Davydov et al. |
| 2014/0094119 A1 | 4/2014 | Stojanovski et al. |
| 2014/0213259 A1 | 7/2014 | Teyeb et al. |
| 2014/0254530 A1 | 9/2014 | Kim et al. |
| 2014/0293973 A1 | 10/2014 | Lin et al. |
| 2014/0301345 A1 | 10/2014 | Kim et al. |
| 2014/0357273 A1* | 12/2014 | Teng .................... H04W 36/32 455/436 |
| 2015/0109982 A1 | 4/2015 | Futaki |
| 2015/0117286 A1 | 4/2015 | Kim et al. |
| 2015/0195822 A1 | 7/2015 | Han et al. |
| 2015/0207604 A1 | 7/2015 | Sun et al. |
| 2015/0215091 A1 | 7/2015 | Lee et al. |
| 2015/0223284 A1 | 8/2015 | Jain et al. |
| 2015/0305083 A1 | 10/2015 | Heo et al. |

FOREIGN PATENT DOCUMENTS

| | | | |
|---|---|---|---|
| CN | 104737485 A | | 6/2015 |
| CN | 104737619 A | | 6/2015 |
| CN | 104813693 A | | 7/2015 |
| CN | 104904303 A | | 9/2015 |
| CN | 105103590 A | | 11/2015 |
| EP | 2146539 | | 1/2010 |
| EP | 2381709 | A1 | 10/2011 |
| EP | 2485540 | A1 | 8/2012 |
| EP | 2798876 | A1 | 11/2014 |
| EP | 2875588 | A | 5/2015 |
| EP | 2901574 | A1 | 8/2015 |
| EP | 2901584 | A1 | 8/2015 |
| EP | 2901603 | A1 | 8/2015 |
| EP | 2901729 | A1 | 8/2015 |
| EP | 2901740 | A1 | 8/2015 |
| EP | 2901810 | A1 | 8/2015 |
| EP | 2901811 | A1 | 8/2015 |
| EP | 2918136 | A1 | 9/2015 |
| ES | 2477040 | A2 | 7/2014 |
| FI | 124643 | B | 11/2014 |
| FR | 2993746 | A1 | 1/2014 |
| GB | 2419067 | A | 4/2006 |
| HK | 1211397 | A1 | 5/2016 |
| JP | 2009171580 | A | 7/2009 |
| JP | 2012507971 | A | 3/2012 |
| JP | 2012100304 | A | 5/2012 |
| JP | 2012104951 | A | 5/2012 |
| JP | 2012520001 | A | 8/2012 |
| JP | 2012175641 | A | 9/2012 |
| JP | 2013533715 | A | 8/2013 |
| JP | 2015525525 | A | 9/2015 |
| JP | 2015532047 | A | 11/2015 |
| JP | 2015534394 | A | 11/2015 |
| KR | 1020090083269 | A | 8/2009 |
| KR | 1020100034675 | A | 4/2010 |
| KR | 20100047449 | A | 5/2010 |
| KR | 1020100047449 | A | 5/2010 |
| KR | 1020110037420 | A | 4/2011 |
| KR | 1020110048422 | A | 5/2011 |
| KR | 1020110097623 | A | 8/2011 |
| KR | 1020110111234 | A | 10/2011 |
| KR | 1020120098899 | A | 9/2012 |
| KR | 1020150040989 | A | 4/2015 |
| KR | 1020150064016 | A | 6/2015 |
| TW | 201409980 | A | 3/2014 |
| TW | I520537 | B | 2/2016 |
| WO | WO-2005008939 | A2 | 1/2005 |
| WO | WO-2010101440 | A2 | 9/2010 |
| WO | WO-2011055999 | A2 | 5/2011 |
| WO | WO-2011100673 | A1 | 8/2011 |
| WO | WO-2011106538 | A1 | 9/2011 |
| WO | WO-2011108889 | A2 | 9/2011 |
| WO | WO-2011116240 | A1 | 9/2011 |
| WO | WO-2011136321 | A1 | 11/2011 |
| WO | WO-2012021018 | A2 | 2/2012 |
| WO | WO-2012043524 | A1 | 4/2012 |
| WO | WO-2012057407 | A1 | 5/2012 |
| WO | WO-2012085637 | A1 | 6/2012 |
| WO | WO-2012094151 | A2 | 7/2012 |
| WO | WO-2012099319 | A1 | 7/2012 |
| WO | WO-2012109542 | A1 | 8/2012 |
| WO | WO-2013107049 | A1 | 7/2013 |
| WO | WO-2013151404 | A1 | 10/2013 |
| WO | WO-2014014576 | A1 | 1/2014 |
| WO | WO-2014051951 | A1 | 4/2014 |
| WO | WO-2014052175 | A1 | 4/2014 |
| WO | WO-2014052303 | A1 | 4/2014 |
| WO | WO-2014052730 | A1 | 4/2014 |
| WO | WO-2014052774 | A1 | 4/2014 |
| WO | WO-2014052850 | A1 | 4/2014 |
| WO | WO-2014052877 | A1 | 4/2014 |
| WO | WO-2014052905 | A1 | 4/2014 |

OTHER PUBLICATIONS

"U.S. Appl. No. 13/706,098, Response filed Oct. 21, 2015 to Non Final Office Action mailed Jun. 4, 2015", 14 pgs.

"U.S. Appl. No. 13/926,273, Response filed Sep. 30, 2015 to Non Final Office Action mailed Apr. 30, 2015", 11 pgs.

"U.S. Appl. No. 13/930,669, Notice of Allowance mailed Oct. 13, 2015", 5 pgs.

"U.S. Appl. No. 14/012,062, Response filed Oct. 23, 2015 to Non Final Office Action mailed Jul. 23, 2015", 11 pgs.

"U.S. Appl. No. 14/027,401, Response filed Dec. 28, 2015 to Non Final Office Action mailed Aug. 26, 2015", 18 pgs.

"U.S. Appl. No. 14/125,706, Non Final Office Action mailed Sep. 30, 2015", 22 pgs.

"U.S. Appl. No. 14/125,749, Response Filed Dec. 9, 2015 to Non Final Office Action mailed Sep. 10, 2015", 10 pgs.

"Chinese Application Serial No. 201380043775.0, Preliminary Amendment filed Oct. 19, 2015", W/ English Claims, 14 pgs.

"Chinese Application Serial No. 201380045150.8, Preliminary Amendment Filed Oct. 8, 2015", w/ English Claims, 41 pgs.

"Chinese Application Serial No. 201380045631.9, Preliminary Amendment filed Oct. 20, 2015", W/ English Claims, 27 pgs.

"European Application Serial No. 13819538.3, Extended European Search Report mailed Dec. 23, 2015", 8 pgs.

"European Application Serial No. 13819538.3, Office Action mailed Mar. 5, 2015", 2 pgs.

"European Application Serial No. 13819538.3, Response filed Sep. 9, 2015 to Office Action mailed Mar. 5, 2015", 9 pgs.

"Japanese Application Serial No. 2015-528726, Office Action mailed Nov. 4, 2015", W/ English Translation, 9 pgs.

"Japanese Application Serial No. 2015-528730, Office Action mailed Nov. 4, 2015", W/ English Translation, 11 pgs.

"Netherlands Application Serial No. 2011185, Response filed Aug. 3, 2015 to Office Action mailed May 27, 2015", W/ English Claims, 9 pgs.

"Spanish Application Serial No. P201331103,Respnse filed Jun. 22, 2015 to Office Action mailed Apr. 28, 2015", W/ English Claims, 19 pgs.

(56) References Cited

OTHER PUBLICATIONS

"Swedish Application Serial No. 1350906-2, Response filed May 19, 2015 to Office Action mailed Feb. 19, 2015", W/ English Claims, 17 pgs.
"Taiwanese Application Serial No. 102125395, Response filed Sep. 21, 2015 to Office Action mailed Jun. 22, 2015", W/ English Claims, 28 pgs.
"Taiwanese Application Serial No. 102125395, Response filed Oct. 16, 2015 to Office Action mailed Jun. 22, 2015", W/ Partial English Claims, 6 pgs.
Huawei, Hisilicon, "Remaining details of CSI-RS configuration", 3GPP TSG-RAN WG1#68b R1-120984, [Online]. Retrieved from the Internet:, (Mar. 30, 2012).
"U.S. Appl. No. 13/706,098, Final Office Action mailed Dec. 17, 2014", 24 pgs.
"U.S. Appl. No. 13/706,098, Response filed Apr. 21, 2015 to Final Office Action mailed Dec. 17, 2014", 15 pgs.
"U.S. Appl. No. 13/706,098, Response filed Sep. 9, 2014 to Non-Final Office Action dated May 9, 2014", 10 pgs.
"U.S. Appl. No. 13/926,273, Non Final Office Action mailed Apr. 30, 2015", 22 pgs.
"U.S. Appl. No. 13/930,669, Non Final Office Action mailed Mar. 25, 2015", 11 pgs.
"Belgium Application Serial No. 2013/0503, Response filed May 5, 2014 to Belgium Search Report mailed Jul. 19, 2013", 8 pgs.
"Chinese Application Serial No. 201380043775.0, Office Action mailed Mar. 11, 2015", 1 pg.
"Chinese Application Serial No. 201380044760.6, Office Action mailed Mar. 18, 2015", 1 pg.
"Chinese Application Serial No. 201380045621.5, Office Action mailed Mar. 17, 2015", 4 pgs.
"Chinese Application Serial No. 201380045631.9, Office Action mailed Mar. 18, 2015", 4 pgs.
"Consideration on Reference Signal for E-PDCCH", InterDigital Communications, LLC, ingar i: 3GPP TSG RAN WG I Meeting #67, RI-113932, San, Francisco, USA, (Nov. 9, 2011).
"European Application Serial No. 13841346.3, Amendment filed Mar. 16, 2015" 25 pgs.
"European Application Serial No. 13841732.4, Amendment filed Feb. 13, 2015", 12 pgs.
"Finland Application Serial No. 20135776, Office Action mailed Jul. 3, 2014", 2 pgs.
"International Application Serial No. PCT/US2013/044756, International Preliminary Report on Patentability mailed Jan. 29, 2015", 6 pgs.
"International Application Serial No. PCT/US2013/058153, International Preliminary Report on Patentability mailed Apr. 9, 2015", 7 pgs.
"International Application Serial No. PCT/US2013/060800, International Preliminary Report on Patentability mailed Apr. 9, 2015", 6 pgs.
"International Application Serial No. PCT/US2013/061379, International Preliminary Report on Patentability mailed Apr. 9, 2015", 9 pgs.
"International Application Serial No. PCT/US2013/062132, International Preliminary Report on Patentability mailed Apr. 9, 2015", 8 pgs.
"International Application Serial No. PCT/US2013/062210, International Preliminary Report on Patentability mailed Apr. 9, 2015", 15 pgs.
"International Application Serial No. PCT/US2013/062340, International Preliminary Report on Patentability mailed Apr. 9, 2015", 8 pgs.
"International Application Serial No. PCT/US2013/062379, International Preliminary Report on Patentability mailed Apr. 9, 2015", 9 pgs.
"International Application Serial No. PCT/US2013/062427, International Preliminary Report on Patentability mailed Apr. 9, 2015", 8 pgs.

"Korean Application Serial No. 10-2015-7005286, Amendment filed Feb. 27, 2015", 5 pgs.
"Spanish Application Serial No. P201331103, Office Action Mailed Oct. 28, 2014", 10 pgs.
"Spanish Application Serial No. P201331103, Search Report mailed Sep. 22, 2014", 4 pgs.
"Spanish Application Serial No. P201331103, Written Opinion mailed Sep. 22, 2014", 4 pgs.
"Spanish Application Serial No. P201331103,Response filed Feb. 18, 2015 to Office Action Mailed Oct. 28, 2014", 2 pgs.
"Sweden Application Serial No. 1350906-2, Office Action mailed Feb. 19, 2015", w/ English Claims, 32 pgs.
"Transmission mode and DCI content for Release 11", Renesas Mobile Europe Ltd, ingar i: 3GPP TSG-RAN WGI Meeting #69, R1-122357, Prague, Czech Republic, (May 12, 2012).
"UE assumption on colocation of antennas", Renesas Mobile Europe Ltd, ingar i: 3GPP TSG-RAN WG 1 Meeting #69, R 1-122334, Prague, Czech, Republic, (May 12, 2012).
"U.S. Appl. No. 13/930,669, Response filed Jun. 25, 2015 to Non Final Office Action mailed Mar. 25, 2015", 12 pgs.
"U.S. Appl. No. 14/012,062, Non Final Office Action mailed Jul. 23, 2015", 15 pgs.
"U.S. Appl. No. 14/027,401, Non Final Office Action mailed Aug. 26, 2015", 35 pgs.
"U.S. Appl. No. 14/125,749, Non Final Office Action mailed Sep. 10, 2015", 10 pgs.
"Netherlands Application Serial No. 2011185, Office Action mailed May 27, 2015", w/ English Claims, 10 pgs.
"Spanish Application Serial No. P201331103, Office Action Mailed Jun. 30, 2015", in English, 3 pgs.
"Taiwanese Application Serial No. 102125395, Office Action mailed Jun. 22, 2015", w/ English Translation, 22 pgs.
Fazackerley, et al., "Cluster head selection using RF signal strength", IEEE lectrical and Computer Engineering, (2009), 334-338.
"U.S. Appl. No. 13/706,098, Non Final Office Action mailed Jun. 4, 2015", 26 pgs.
"U.S. Appl. No. 14/027,401, Preliminary Amendment filed Dec. 26, 2014", 16 pgs.
"Chinese Application Serial No. 201310304357.4, Preliminary Amendment filed Jun. 20, 2014", W/ English Claims, 8 pgs.
"Finnish Application Serial No. 20135776, Response filed Jun. 23, 2014 Office Action mailed Apr. 9, 2014", W/ English Claims, 13 pgs.
"R1-121935: Interference Measurement Mechanism for Rel-11", 3GPP TSG RAN WG1 Meeting #69, (May 2012), 10 pgs.
"R1-124046: Final Report of 3GPP TSG RAN WG1 #70 v1.0.0", 3GPP TSG RAN WG1 Meeting #70bis, (Oct. 2012), 118 pgs.
"Spanish Application Serial No. P201331103, Office Action mailed Apr. 28, 2015", w/ English Translation, 8 pgs.
"Spanish Application U.S. Appl. No. P201331103,Response filed Jan. 30, 2015 to Office Action Mailed Sep. 22, 2014", W/ English Claim chart, 2 pgs.
"U.S. Appl. No. 13/706,098, Non Final Office Action mailed May 9, 2014", 21 pgs.
"U.S. Appl. No. 13/706,098, Preliminary amendment filed Sep. 12, 2013", 8 pgs.
"U.S. Appl. No. 14/125,706, Preliminary Amendment filed Dec. 12, 2013", 14 pgs.
"U.S. Appl. No. 14/125,749, Preliminary Amendment filed Dec. 12, 2013", 8 pgs.
"U.S. Appl. No. 14/126,252, Preliminary Amendment filed Dec. 13, 2013", 5 pgs.
"Evolved Universal Terrestrial Radio Access (E-UTRA); Physical layer procedures", 3GPP TS 36.213 V10.6.0. Technical Specification Group Radio Access Network. Release 10., (Jun. 2012), 1-125.
"Evolved Universal Terrestrial Radio Access (E-UTRA); Radio Resource Control (RRC);", 3GPP Ts 36.331 V11.1.0 (Sep. 2012) Technical Specification Group Radio Access Network; Protocol specification (Release 11), (Sep. 2012), 325 pgs.

(56) References Cited

OTHER PUBLICATIONS

"Evolved Universal Terrestrial Radio Access (E-UTRA); User Equipment (UE) procedures in idle mode", 3GPP TS 36.304 V11.1.0. Technical Specification Group Radio Access Network. (Release 11)., (Sep. 2012), 33 pgs.
"Finland Application Serial No. 20135776, Office Action mailed Apr. 9, 2014", English translation, 6 pgs.
"HARQ-ACK PUCCH Resources in Response to ePDCCH Detections", R1-122259, 3GPP TSG RAN WG1 #69. Prague, Czech Republic. Samsung., (May 21, 2012), 2 pgs.
"HARQ-ACK Transmission in Response to E-PDCCH Detection", R1-120193, 3GPP TSG RAN WG1 #68. Samsung., (Feb. 2012), 3 pgs.
"International Application Serial No. PCT/US2013/044756, International Search Report mailed Nov. 15, 2013", 3 pgs.
"International Application Serial No. PCT/US2013/044756, Written Opinion mailed Nov. 15, 2013", 4 pgs.
"International Application Serial No. PCT/US2013/058153, International Search Report mailed Dec. 13, 2013", 3 pgs.
"International Application Serial No. PCT/US2013/058153, Written Opinion mailed Dec. 13, 2013", 5 pgs.
"International Application Serial No. PCT/US2013/060800, International Search Report mailed Jan. 16, 2014", 3 pgs.
"International Application Serial No. PCT/US2013/060800, Written Opinion mailed Jan. 16, 2014", 4 pgs.
"International Application Serial No. PCT/US2013/061379, International Search Report mailed Jan. 2, 2014", 3 pgs.
"International Application Serial No. PCT/US2013/061379, Written Opinion mailed Jan. 2, 2014", 7 pgs.
"International Application Serial No. PCT/US2013/062132, International Search Report mailed Jan. 28, 2014", 3 pgs.
"International Application Serial No. PCT/US2013/062132, Written Opinion mailed Jan. 28, 2014", 6 pgs.
"International Application Serial No. PCT/US2013/062210, International Search Report mailed Feb. 28, 2014", 4 pgs.
"International Application Serial No. PCT/US2013/062210, Invitation to Pay Additional Fees and Partial Search Report mailed Dec. 16, 2013", 7 pgs.
"International Application Serial No. PCT/US2013/062210, Written Opinion mailed Feb. 28, 2014", 13 pgs.
"International Application Serial No. PCT/US2013/062340, International Search Report mailed Jan. 28, 2014", 6 pgs.
"International Application Serial No. PCT/US2013/062340, Written Opinion mailed Jan. 28, 2014", 6 pgs.
"International Application Serial No. PCT/US2013/062379, International Search Report mailed Jan. 6, 2014", 6 pgs.
"International Application Serial No. PCT/US2013/062379, Written Opinion mailed Jan. 6, 2014", 7 pgs.
"International Application Serial No. PCT/US2013/062427, International Search Report mailed Jan. 6, 2014", 3 pgs.
"International Application Serial No. PCT/US2013/062427, Written Opinion mailed Jan. 6, 2014", 6 pgs.
"PUCCH Resource Allocation Corresponding to ePDCCH", R1-120666, 3GPP TSG RAN WG1 Meeting #68. ASUSTEK., (Feb. 2012), 2 pgs.
"PUCCH resource allocation for E-PDCCH", R1-120329, 3GPP TSG RAN1 #68. Pantech., (Feb. 2012), 2 pgs.
"PUCCH resource for ePDCCH", R1-123266, 3GPP TSG RAN WG1 Meeting #70. Qingdao, China. Sharp., (Aug. 13, 2012), 8 pgs.
"PUCCH resource mapping with ePDCCH", R1-114066, 3GPP TSG RAN WG1 Meeting #67. Alcatel-Lucent Shanghai Bell, Alcatel-Lucent., (Nov. 2011), 2 pgs.
Chou, Joey, et al., "M2M Polling services", IEEE C802.16p-11/0016r1. IEEE 802.16 Broadband Wireless Access Working Group., [Online] Retrieved From Internet: <http://dot16.org/ul_archive/archive11/archive.shtml>, (Mar. 13, 2011), 12 pgs.
Davies, Thomas, "Linux Ethernet Bonding Driver HOWTO", [Online]. Retrieved from the Internet: <URL: https://www.kernel.org/doc/Documentation/networking/bonding.txt>, (Apr. 27, 2011), 46 pgs.
Hayashi, Toshiki, "Evolved Packet Core (EPC) Network Equipment for Long Term Evolution (LTE)", Fujitsu Sci. Tech. J., vol. 48, No. 1, (Jan. 2011), 17-20.
Je, Hui Won, et al., "Long-Term Channel Information-Based CoMP Beamforming in LTE-Advanced Systems", 2011 IEEE Global Telecommunications Conference (GLOBECOM 2011), (2011), 1-6.
"U.S. Appl. No. 13/706,098, Final Office Action mailed Feb. 16, 2016", 28 pgs.
"U.S. Appl. No. 13/926,273, Final Office Action mailed Jan. 15, 2016", 28 pgs.
"U.S. Appl. No. 13/926,273, Response filed Mar. 15, 2016 to Final Office Action mailed Jan. 15, 2016", 11 pgs.
"U.S. Appl. No. 14/012,062, Final Office Action mailed Feb. 2, 2016", 16 pgs.
"U.S. Appl. No. 14/125,706, Notice of Allowance mailed Feb. 2, 2016", 10 pgs.
"U.S. Appl. No. 14/125,749, Corrected Notice of Allowance mailed Feb. 9, 2016", 2 pgs.
"U.S. Appl. No. 14/126,252, Response filed Mar. 21, 2016 to Non Final Office Action mailed Dec. 21, 2015", 13 pgs.
"U.S. Appl. No. 14/757,660, Preliminary Amendment filed Mar. 3, 2016", 5 pgs.
"Brazilian Application Serial No. BR112015004036-5, Voluntary Amendment filed Jan. 13, 2016", w/o English Translation, 55 pgs.
"Chinese Application Serial No. 201310304357.4, Office Action mailed Feb. 24, 2016", Without English Translation, 4 pgs.
"Chinese Application Serial No. 201380044760.6, Voluntary Amendment filed Jan. 7, 2016", W/ English claims, 5 pgs.
"Design of PDSCH muting for CSI-RS in LTE-Advanced", 3G PP TSG RAN WG1 Meeting #62bis R1-105223, (Oct. 4, 2010), 1-5 pgs.
"European Application Serial No. 13841346.3, Extended European Search Report mailed Mar. 3, 2016", 8 pgs.
"HARQ-ACK PUCCH Resources in Response to E-PDCCH Detections", Samsung, R1-121647, 3GPP, (Mar. 20, 2012).
"Japanese Application Serial No. 2015-516247, Office Action mailed Feb. 9, 2016", W/ English Translation, 4 pgs.
"Japanese Application Serial No. 2015-534731, Non Final Notice of Reasons for Rejection mailed Mar. 1, 2016", W/ English Translation, 8 pgs.
"Korean Application Serial No. 2015-7004962, Notice of Preliminary Rejection mailed Feb. 5, 2016", (English Translation), 11 pgs.
"Remaining Issues on Resource Allocation for TDD PUCCH format 3", LG Electronics, R1-111692, 3GPP, (May 3, 2011).
"Views on PUCCH Resource Allocation for ePDCCH", NTT DOCOMO, R1-123554, 3GPP, (Aug. 5, 2012).
"WF on PUCCH Format 1a/1b resource allocation for ePDCCH based HARQ-ACKs", Sharp, Nokia Siemens Networks, Nokia, Samsung, Docomo, WF R1-123975, 3GPP, (Aug. 17, 2012).
Alcatel-Lucent, Shanghai Bell, "Further Discussion of Quasi-colocated antenna ports", 3GPP TSG-RAN1 Meeting #69 R1-122458, (May 13, 2012), 1-3 pgs.
"U.S. Appl. No. 13/706,098, Advisory Action mailed May 12, 2016", 3 pgs.
"U.S. Appl. No. 13/706,098, Response filed Apr. 15, 2016 to Final Office Action mailed Feb. 16, 2016", 14 pgs.
"U.S. Appl. No. 13/926,273, Advisory Action mailed Apr. 26, 2016", 4 pgs.
"U.S. Appl. No. 14/027,401, Response filed Jul. 1, 2016 to Final Office Action mailed Apr. 1, 2016", 12 pgs.
"U.S. Appl. No. 14/125,706, Notice of Allowability mailed May 20, 2016", 2 pgs.
"European Application Serial No. 138405428, Extended European Search Report mailed Apr. 20, 2016", 9 pgs.
"European Application Serial No. 13841732.4, Extended European Search Report mailed Apr. 7, 2016", 9 pgs.
"European Application Serial No. 13842606.9, Extended European Search Report mailed Jun. 21, 2016", 6 pgs.
"European Application Serial No. 13842671.3, Extended European Search Report mailed May 25, 2016", 9 pgs.

(56) References Cited

OTHER PUBLICATIONS

"European Application Serial No. 13842956.8, Extended European Search Report mailed May 2, 2016", 10 pgs.

"Japanese Application Serial No. 2015-516247, Response filed May 6, 2016 to Office Action mailed Feb. 9, 2016", W/ English Claims, 20 pgs.

"Korean Application Serial No. 2015-7004962, Response filed May 4, 2016 to Notice of Preliminary Rejection mailed Feb. 5, 2016", W/ English Translation of Claims, 28 pgs.

"Mobility State Estimation Enhancements using RSR", R2-132810 Mobility State Estimation Using Rsrp, 3rd Generation Partnership Project (3GPP), Mobile Competence Centre ; 650, Route Des Lucioles, (Aug. 10, 2013), 20130819-20130823.

"U.S. Appl. No. 14/027,401, Examiner Interview Summary mailed Dec. 14, 2016", 3 pgs.

"CR on the addition of the stage-2 agreements on IDC", 3GPP TSG-RAN WG2 Meeting #79, Version 11.20, R2-124311, (Aug. 13-17, 2012), 7 pgs.

"European Application Serial No. 13842671.3, Response filed Dec. 12, 2016 to Extended European Search Report mailed May 25, 2016", 27 pgs.

"European Application Serial No. 13842956.8, Response filed Nov. 30, 2016 to Extended European Search Report mailed May 2, 2016", 18 pgs.

"European Application Serial No. 16170339.2, Extended European Search Report mailed Jan. 3, 2017", 9 pgs.

"Japanese Application Serial No. 2016-030724, Office Action mailed Dec. 6, 2016", W/ English Translation, 10 pgs.

"Korean Application Serial No. 10-2015-7005276, Response filed Dec. 21, 2016 to Office Action mailed Oct. 21, 2016", w/ English Claims, 18 pgs.

"Korean Application Serial No. 2016-7023863, Office Action mailed Nov. 17, 2016", w/English Translation, 8 pgs.

"Open issues of in-device coexistence", 3GPP TSG RAN WG2 Meeting #79bis, R2-124968, (Oct. 8-12, 2012), 2 pgs.

"Preservation Procedure for Active to Idle Transition in E-UTRAN Access", ETRI-3GPP TSG SA WG2 Architecture—S2-072526, (Jun. 2007), 3 pgs.

"RAN2 CR for REL-11 WI Core part: Signalling and procedure for interference avoidance for in-device coexistence", 3GPP TSG-RAN Meeting #57, RP-121379, (Sep. 4-7, 2012), 1 pg.

"Sweden Application Serial No. 1650746-9, Response filed Dec. 23, 2016 to Office Action mailed Aug. 25, 2016", w/English Claims, 22 pgs.

* cited by examiner

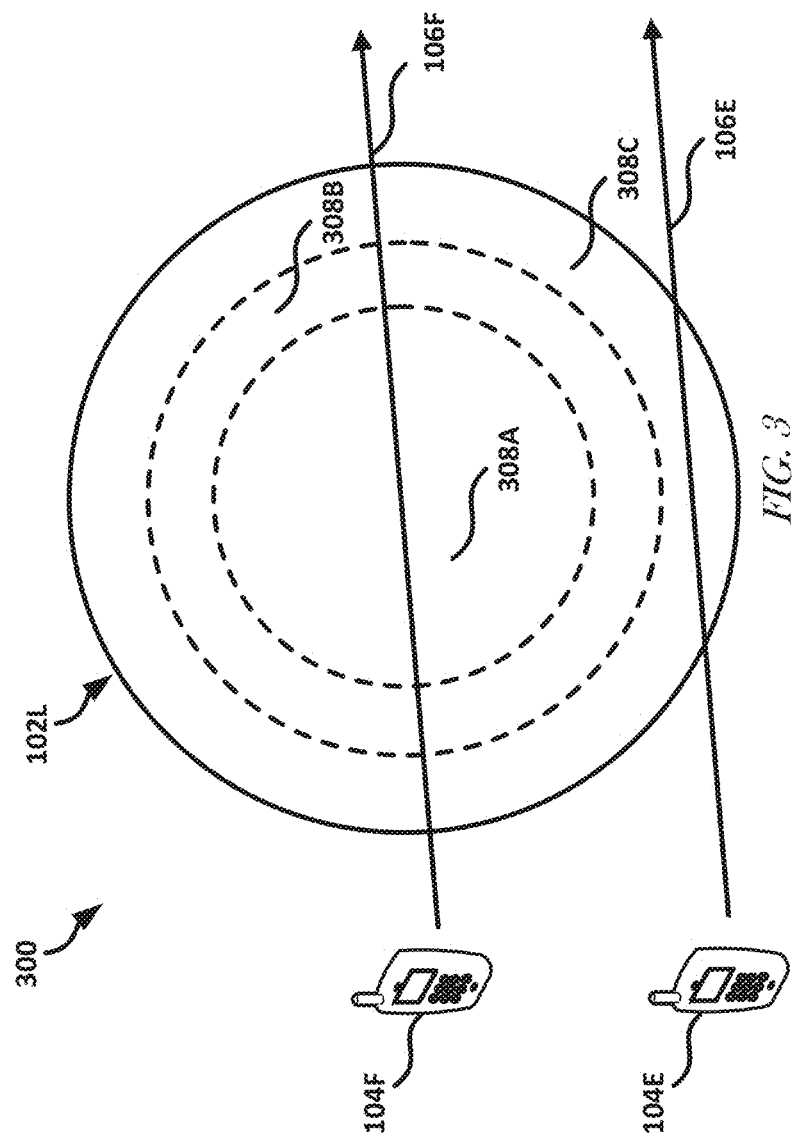

*MobilityStateParameters-r12*

The IE *MobilityStateParameters* contains parameters to determine UE mobility state.

*MobilityStateParameters-r12* information element

```
-- ASN1START

MobilityStateParameters-r12 ::=     SEQUENCE {
    t-Evaluation                    ENUMERATED {
                                        s30, s60, s120, s180, s240, spare3, spare2, spare1},
    t-HystNormal                    ENUMERATED {
                                        s30, s60, s120, s180, s240, spare3, spare2, spare1},
    n-mediumThreshold               INTEGER (1..1000),
    n-highThreshold                 INTEGER (1..1000),
}

-- ASN1STOP
```

FIG. 4A

| MobilityStateParameters field descriptions |
|---|
| n-mediumThreshold |
| The sum of RSRP difference threshold [dB] to enter medium mobility state. Corresponds to $N_{CR\_M}$ in TS 36.304. |
| n-highThreshold |
| The sum of RSRP difference threshold [dB] to enter high mobility state. Corresponds to $N_{CR\_M}$ in TS 36.304. |
| t-Evaluation |
| The duration for evaluating criteria to enter mobility states. Corresponds to $T_{CRmax}$ in TS 36.304. Value in seconds, s30 corresponds to 30 s and so on. |
| t-HystNormal |
| The additional duration for evaluating criteria to enter normal mobility state. Corresponds to $T_{CRmaxHyst}$ in TS 36.304. Value in seconds, s30 corresponds to 30 s and so on. |

FIG. 4B

MobilityStateParameters-r12

The IE *MobilityStateParameters* contains parameters to determine UE mobility state.

MobilityStateParameters-r12 information element

```
-- ASN1START

MobilityStateParameters-r12 ::=    SEQUENCE {
    t-Evaluation                   ENUMERATED {
                                       s30, s60, s120, s180, s240, spare3, spare2, spare1},
    t-HystNormal                   ENUMERATED {
                                       s30, s60, s120, s180, s240, spare3, spare2, spare1},
    n-mediumThreshold              INTEGER (1..1000),
    n-highThreshold                INTEGER (1..1000),
    weight                         INTEGER (1..10),
}

-- ASN1STOP
```

FIG. 5A

| MobilityStateParameters-r12 field descriptions |
|---|
| n-mediumThreshold |
| The sum of RSRP difference threshold [dB] to enter medium mobility state. Corresponds to $N_{CR\_M}$ in TS 36.304. |
| n-highThreshold |
| The sum of RSRP difference threshold [dB] to enter high mobility state. Corresponds to $N_{CR\_M}$ in TS 36.304. |
| Weight |
| Multiplication factor applied to RSRP difference based on current cell pathloss and cell size. |
| t-Evaluation |
| The duration for evaluating criteria to enter mobility states. Corresponds to $T_{CRmax}$ in TS 36.304. Value in seconds, s30 corresponds to 30 s and so on. |
| t-HystNormal |
| The additional duration for evaluating criteria to enter normal mobility state. Corresponds to $T_{CRmaxHyst}$ in TS 36.304. Value in seconds, s30 corresponds to 30 s and so on. |

FIG. 5B

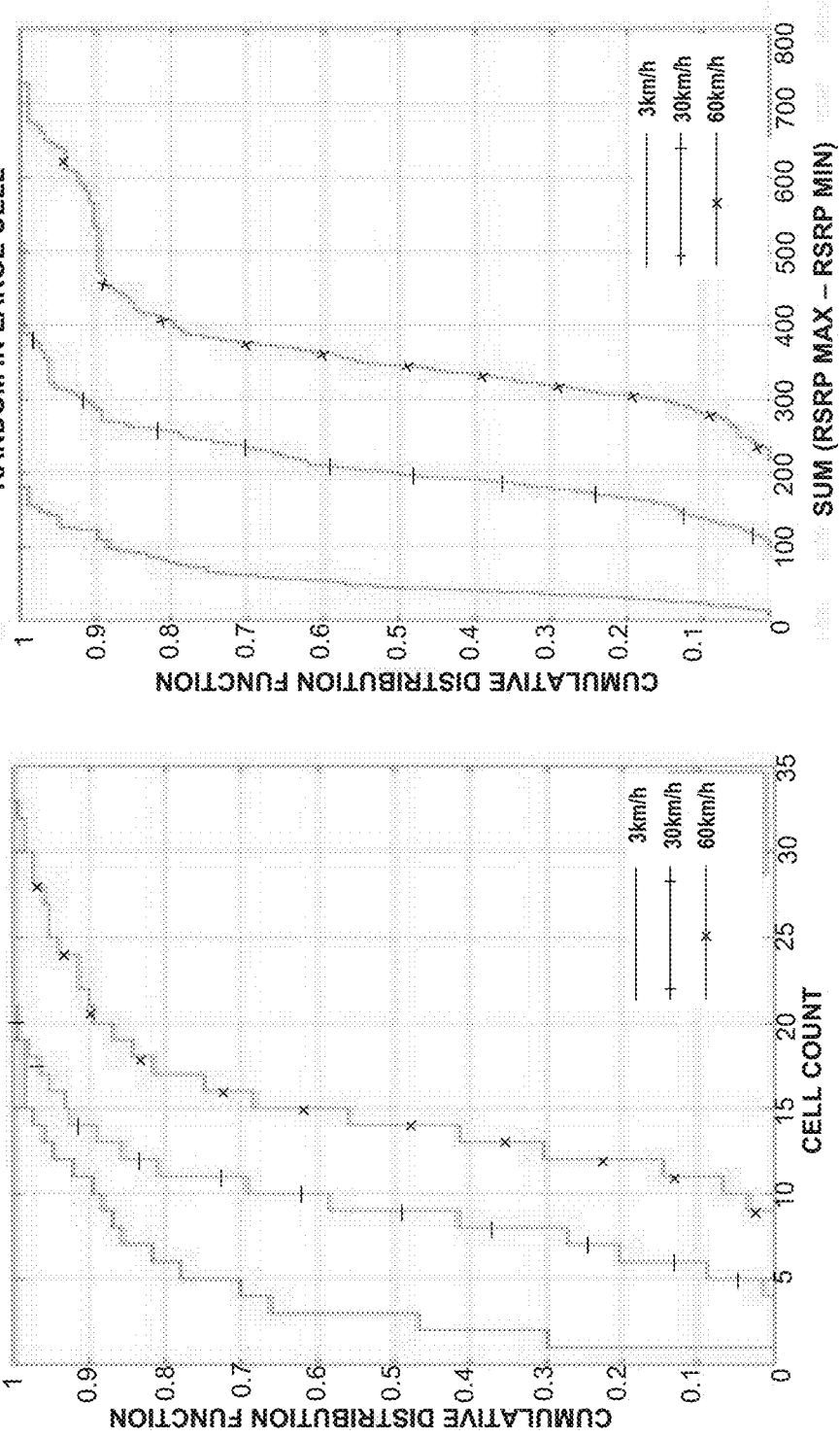

| Type | A | B | C | D | E |
|---|---|---|---|---|---|
| MobilityStateEstimation:: t_evaluation ($T_{CRmax}$) | 120 | 60 | 30 | 30 | 30 |
| MobilityStateEstimation:: t_hystnormal ($T_{CRmaxHyst}$) | 30 | 30 | 30 | 30 | 30 |
| MobilityStateEstimation:: n_CellChangeMedium ($N_{CR\_M}$) | 1 | 1 | 1 | 3 | 7 |
| MobilityStateEstimation:: n_CellChangeHigh ($N_{CR\_H}$) | 2 | 2 | 2 | 5 | 11 |

*FIG. 10*

RSRP MOBILITY STATE ESTIMATION FOR CELLULAR DEVICE

RELATED APPLICATION

This application is a U.S. National Stage Application under 35 U.S.C. §371 of International Application No. PCT/US2013/062427, filed Sep. 27, 2013, which application claims priority to U.S. Provisional Application Ser. No. 61/707,784, filed Sep. 28, 2012, which applications are incorporated herein by reference in their entirety.

TECHNICAL FIELD

Examples generally relate to mobility enhancement in a cellular network and more specifically to a weighted Reference Signal Received Power (RSRP) Mobility State Estimation (MSE) for LTE.

TECHNICAL BACKGROUND

The current LTE specification includes an MSE that can be inaccurate in a number of situations. This is due to, at least in part, the current MSE not accounting for User Equipment (UE) trajectory or the size of the cell(s) the UE is travelling through.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 3 illustrates an example of a cellular network.

FIG. 4A illustrates an example of a modification to section 36.331 of the Rel-11 specification.

FIG. 4B illustrates a table that includes an example of definitions for the parameters of the modification to the LTE specification shown in FIG. 4A.

FIG. 5A illustrates an example of a modification to section 36.331 of the Rel-11 specification.

FIG. 5B illustrates a table that includes an example of definitions for the parameters of the modification to the LTE specification shown in FIG. 5A

FIG. 9A illustrates a graph of a CDF vs. cell count calculated by a UE in a cellular network with four small cells deployed at random within the coverage area of a large cell.

FIG. 9B illustrates a graph of a CDF vs. the sum of the differences of RSRP maximum and RSRP minimum values calculated by a UE in a cellular network with four small cells deployed at random within the coverage area of a large cell.

FIG. 10 illustrates a table of parameters that were used for simulations that produced the graphs shown in FIGS. 6A, 6B, 7A, 7B, 8A, 8B, 9A, 9B, 11, and 12.

DESCRIPTION OF EMBODIMENTS

Examples in this disclosure relate to apparatuses and systems that include an MSE for an LTE network. Examples also relate to techniques of using and implementing the MSE.

The following description includes terms, such as first, second, etc. that are used for descriptive purposes only and are not to be construed as limiting. The examples of an apparatus or article described herein can be manufactured, used, or shipped in a number of positions and orientations.

In LTE Rel-12, mobility enhancement will be an area that may be improved from the latest update in LTE Rel-8. Many enhancements to UE mobility awareness can be based on improving MSE algorithm accuracy.

The following description regards MSE in TS 36.304. The following description is for a UE in idle mode, but the same algorithm can apply equally to a UE in connected mode. The MSE algorithm uses a number of cell counts (e.g., cell reselections, such as for a UE in idle mode, or HandOvers (HOs), such as for a UE in connected mode) within a specified evaluation period (e.g., $T_{Eval}$) to determine the UE MSE. If a cell count exceeds a specified high cell count number (e.g., $N_{CR\_H}$) UE can that it is in a high mobility state. If the cell count exceeds a specified medium cell count number (e.g., $N_{CR\_M}$) and is less than the high cell count number, the UE can determine that it is in a medium mobility state. In all other cases, the UE can determine that it is in a normal mobility state. A hysteresis time (e.g., $T_{CRmaxHyst}$) can be used to evaluate whether the UE entered a normal mobility state, such as by defining a time duration above an evaluation time (e.g., $T_{CRmax}$) that the MSE algorithm will wait before returning to a normal mobility state from a different mobility state.

The state transitions can be summarized as: 1) if the criteria for high mobility are detected then enter high mobility state; 2) else if the criteria for medium mobility is detected then enter medium mobility state; and 3) else if criteria for neither high mobility or medium mobility is detected during the evaluation time plus the hysteresis time then enter normal mobility state.

Reference will now be made to the drawings wherein like structures will be provided with like suffix reference designations. In order to show the structures of various examples clearly, the drawings included herein are diagrammatic representations of integrated circuit structures. The drawings show structures to aid in understanding the illustrated examples.

Figure 1:
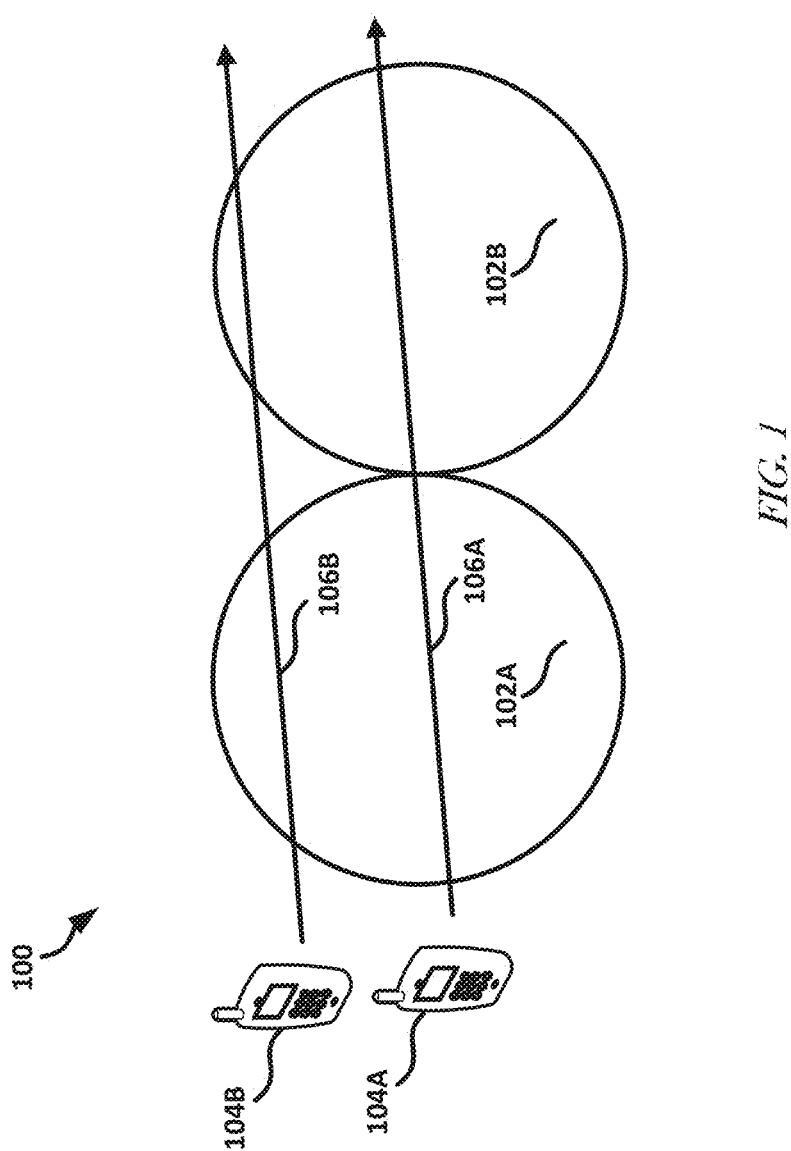
FIG. 1 illustrates an example of a homogeneous cellular network.

FIG. 1 shows an example of a homogeneous network 100. The homogeneous network 100 can include one or more cells 102A and 102B of the same size. Two or more UEs 104A and 104B can be travelling the same direction (indicated by the solid arrows 106A and 106B, respectively) and at the same speed. The UE 104A has a cell count of three, while the UE 104B has a cell count of two in the example shown in FIG. 1. The MSE of the UEs 104A and 104B can be different because the trajectory of a UE is not considered in the MSE algorithm used in this example, which is the same as the MSE algorithm from previous LTE specifications.

Figure 2:
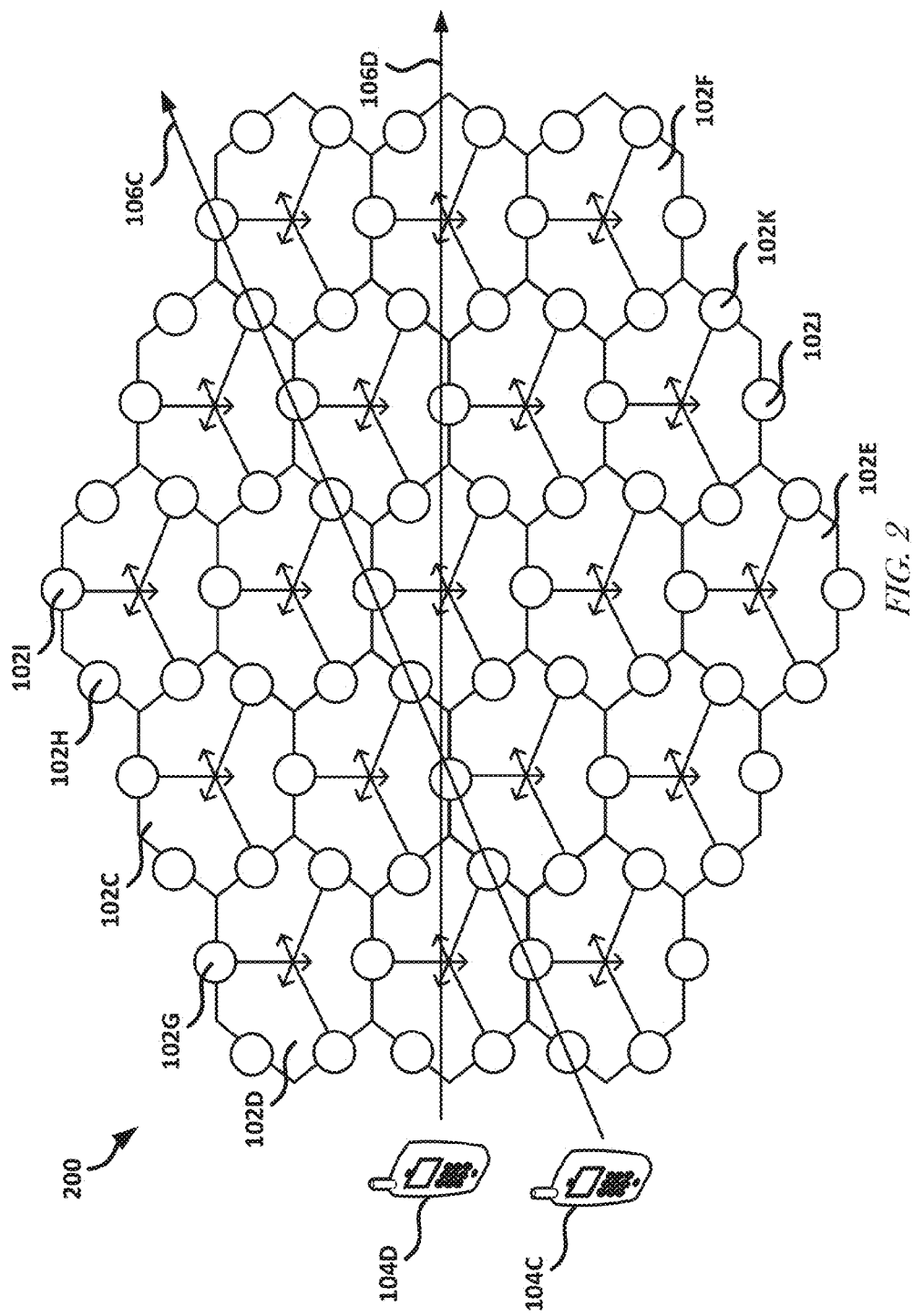
FIG. 2 illustrates an example of a heterogeneous cellular network.

FIG. 2 shows an example of a heterogeneous network 200. The heterogeneous network 200 can include a plurality of cells 102C, 102D, 102E, 102F, 102G, 102H, 102I, 102J, and 102K. The cells 102C-102F (and the other hex-shaped cells shown in FIG. 2) can each be large cells (e.g., macro cells), while the cells 102G-102K can each be small cells (e.g., micro cells, pico cells, or femto cells). Two or more UEs 104C and 104D can travel the same distance in the network, such as over the same amount of time, and the two or more UEs 104C and 104D can have differing cell counts. In the example of FIG. 2, UE 104D can have a cell count of nine, while the UE 104C can have a cell count of 19, if they use the MSE algorithm of the current LTE Rel-11. The MSE specified in Rel-8 (the most current MSE specification as of the filing of this application) does not account for cell size (e.g., large, small, macro, micro, pico, or femto), so it is not very well suited for Heterogeneous Network (HetNet) environments, as is demonstrated in FIG. 2.

FIG. 3 shows an example of a network 300 that includes a cell 102L, two UEs 104E and 104F. The UEs 104E and 104F can be travelling in a similar trajectory 106E and 106F, respectively, such as at the same speed. Instead of counting the number of cells that the UE connects to or that reselects the UE, the RSRP signal value detected by the UE can be used to get a more accurate determination of the MSE in this example. The RSRP signal that the UE uses to measure RSRP can be from the base station (e.g., an eNodeB) that is currently serving the UE.

In the example shown in FIG. 3, the dotted lines indicate regions of relative RSRP strength. Region 308A (from the center of the cell 102L to the innermost dotted line) is closest to the base station (or the center of the cell) so it will likely have a relatively large RSRP reading at the UE, as compared to regions 308B and 308C. Region 308B (the region between the two dotted lines) will likely have a lower RSRP reading than the RSRP reading in region 308A because it is further from the center of the cell 102L. Region 308C (the region between the outermost dotted line and the outer edge of the cell 102L) will likely have the lowest RSRP reading at the UE because it is farthest from the center of the cell 102L.

Accuracy of the MSE calculation of a UE can be improved over the current MSE algorithm in the LTE specification by having the UE calculate the maximum and minimum values of RSRP experienced when the UE interacts with (e.g., connects to, such as through an HO, or is reselected by) a cell. The UE can determine a difference between the maximum RSRP and the minimum RSRP and use this determined difference in determining the MSE. The UE can sum the differences calculated for each cell it interacts with in a specified period of time (e.g., $T_{Eval}$). The specified period of time can be a sliding window of a specified number of seconds. For example if the specified period of time is 120 seconds, at time t=0 the UE can sum the differences between the maximum and minimum RSRPs for 120 seconds, then the UE can sum the differences for another 10 seconds, and add the sum of the differences for the most recent 120 seconds (e.g., the sum of the differences accrued between t=10 s and 130 s), and so on.

If this algorithm were used by the UEs 104E and 104F of FIG. 3, then UE 104E will likely calculate a lower RSRP difference then 104F. This is because the UE 104E travels only in region 308C, which has the lowest RSRP value of the regions shown in FIG. 3 and thus the calculated difference between the maximum RSRP and minimum RSRP observed by the UE 104E is relatively small; while UE 104F travels through all three regions, thus making the difference between the maximum RSRP and the minimum RSRP observed greater, because the center of the cell 102L (e.g., region 308A) likely has a higher RSRP than the RSRP in region 308C. These RSRP value difference calculated by the UEs 104E and 104F can correspond to the distance travelled by the respective UE 104E and 104F in the cell 102L for a wide range of trajectories 106. In general, but not always, the UE 104 will calculate a larger difference between the minimum and maximum RSRP values when it travels a larger distance within a given cell 102. This generality does not hold for some trajectories, though. Consider a UE 104 with a circular trajectory with a radius between the outermost dotted line and the outer edge of the cell 102L (e.g., within region 308C) of FIG. 3. That UE 104 will likely calculate a small difference between the maximum and minimum RSRPs while having travelled a relatively long distance in the cell 102L.

An MSE algorithm that determines MSE as a function of an RSRP difference can be summarized as shown in Equation 1:

$$x = \sum_{cell\ i=n1}^{n2} (RSRP_{cell\ i\ max} - RSRP_{cell\ i\ min}) \qquad \text{Equation 1.}$$

In Equation 1, cells n1 to n2 are cells that the UE interacted with (e.g., connected to or was reselected by) for a specified time period ($T_{CR\_MAX}$). For example, n2 is the cell currently serving the UE and cells n1, n1+1, n1+2 ... n2-1 are the cells that the UE either connected to or was reselected by for a specified evaluation time period. In Equation 1, $RSRP_{cell\ i\ max}$ is the maximum RSRP in cell i during the time the UE was interacting with, connected to, or within the coverage area of cell i. In Equation 1, $RSRP_{cell\ i\ min}$ is the minimum RSRP in cell i during the time the UE was interacting with, connected to, or within the coverage area of cell i.

A number of MSE algorithms that are based on a difference between a maximum RSRP and a minimum RSRP experienced by a UE that has been connected to or reselected by a cell are now described in more detail.

In one or more embodiments, the MSE algorithm can include one or more specified thresholds that delineate between mobility states. For example, in an MSE algorithm that includes one specified threshold (e.g., α), the UE can determine it is in a high mobility state when it determines that x (from Equation 1) is greater than α. If the UE determines that x is less than or equal to α, the UE can determine that it is in a normal mobility state. In another example, for an MSE algorithm that includes two specified thresholds (e.g., α and β, where β>α), the UE can determine it is in a normal mobility state when x is less than or equal to α, a high mobility state when x is greater than β, and a medium mobility state when α is less than x and x is less than or equal to β. The specified thresholds (e.g., α and β) can be set by the network and signaled to the UE by higher layer signaling (e.g., a base station or an eNodeB). Further delineations can be achieved by signaling more specified thresholds to the UE. For example, by signaling three specified thresholds the UE can distinguish between four mobility states (e.g., low mobility, normal mobility, medium mobility, and high mobility). Even more mobility states can be realized by sending more specified thresholds and comparing x to the specified thresholds.

FIG. 4A illustrates an example of a modification to 36.331 of the Rel-11 specification, such as to implement an MSE algorithm that includes determining an RSRP difference, such as an MSE algorithm that includes Equation 1. The parameters enumerated in FIG. 4A can allow the UE to perform an MSE algorithm that includes determining x of Equation 1. The parameters are each defined in the table of FIG. 4B.

In one or more embodiments, the differences between the maximum RSRP and the minimum RSRP can each be multiplied by a specified weight before the differences are summed. Equation 2, summarizes this algorithm:

$$x = \sum_{cell\,i=n1}^{n2} (RSRP_{cell\,i\,max} - RSRP_{cell\,i\,min}) \times weight_i \qquad \text{Equation 2}$$

In Equation 2, cells n1 to n2 are the cells the UE interacted with in the evaluation period (e.g., t-Evaluation). The weight, is the weighting factor for each cell. The weighting factor can be configured in the UE through Radio Resource Control (RRC) signaling or a System Information Block (SIB) transmission. There are many schemes that can be used in implementing the weighting factor. In one or more embodiments, the network protocol may define that no weighting factor is to be used (e.g., weight_i=1). In one or more embodiments, a fixed weighting factor may be used, such that each cell is given the same weight, regardless of cell size or other cell parameters or characteristics. In one or more embodiments, the weighting factor can be determined as a function of cell size, such that a different weighting factor is used for large cells and small cells, or such that a different weighting factor is used for each of macro cells, micro cells, pico cells, and femto cells. Other iterations and combinations can be used, such as weighting pico cells and femto cells the same and weighting macro cells and micro cells different from each other and the pico and femto cells, etc. The cell size dependent weighting factor can be used for UEs in connected mode. The cell size dependent weighting factor can account for a path loss with respect to a distance (e.g., from a base station) or a relationship between path loss and cell size.

FIG. 5A illustrates an example of a modification to 36.331 of the Rel-11 specification configured to allow cell size dependent weighting factors to be used in an MSE LTE algorithm. The parameters enumerated in FIG. 5A can allow the UE to perform an MSE algorithm using one or more weighting factors. The parameters of FIG. 5A are defined in the table of FIG. 5B.

In one or more embodiments, an MSE algorithm can be a function of a cell count, a difference between a maximum RSRP and a minimum RSRP, and a weighting factor. The weighting factor can be determined as a function of the difference between the maximum RSRP and the minimum RSRP. A number of such MSE algorithms are described in Equation 3 and the description that follows.

$$x = \sum_{cell\,i=n1}^{n2} weight_i. \qquad \text{Equation 3}$$

In the current LTE system, the MSE is determined as a function of the number of cells a UE has interacted with (e.g., a cell count) in a specified period of time. This cell count of the current system can be modified by a weighting factor that is determined as a function of the difference between the maximum RSRP and minimum RSRP detected by the UE in the given cell. For example, if the difference between the maximum and the minimum RSRP is less than or equal to a first specified threshold (e.g., a threshold determined by the network and communicated to the UE through a base station) then the weighting factor (e.g., weight_i) can be a specified value $k_{low}$. In one or more examples, if the difference between the maximum and the minimum RSRP is less than or equal to a second specified threshold and greater than the first specified threshold then the weighting factor can be specified value $k_{medium}$, where $k_{medium}$ is greater than $k_{low}$. In one or more examples, if the difference between the maximum and the minimum RSRP is greater than the second specified threshold or the first specified threshold then the weighting factor can be equal to specified value $k_{high}$, where $k_{high}$ is greater than $k_{medium}$ and greater than $k_{low}$. The specified thresholds and the corresponding weighting factor numbers can be configured by higher layer signaling. The value x from Equation 3 can replace the number of cell reselections in the current LTE MSE algorithm as follows: 1) the UE determines it is in a medium mobility when, during time period $T_{CRmax}$, x is greater than $N_{CR\_M}$ and less than or equal to $N_{CR\_H}$; 2) the UE determines it is in a high mobility state when, during time period $T_{CRmax}$, x is greater than $N_{CR\_H}$; and 3) in all other cases the UE determines it is in a normal mobility state.

Note that other methods of determining an MSE as a function of a difference between a maximum RSRP and a minimum RSRP can be implemented using the teaching of this disclosure. For example, an RSRP difference can be determined and a corresponding value to be used in an MSE algorithm can be determined by looking up the determined RSRP difference in a lookup table. The lookup table can be organized as a function of cell size, path loss, RSRP difference, or a combination thereof. The table can include ranges of values of an RSRP difference that map to one or more specified values. The table can include different values for different cell sizes or path losses or the table can be independent of cell size. The value in the table that corresponds to the determined RSRP difference in the cell can be substituted for the determined RSRP difference in the MSE algorithm.

One or more of the embodiments discussed above that includes substituting difference in the RSRP maximum and minimum with a substitute RSRP can help bound the error of the system in the case of an error in calculating RSRP.

Simulation results of many of the MSE algorithms discussed herein are presented in FIGS. 6A, 6B, 7A, 7B, 8A, 8B, 9A, 9B, 11, and 12. The table of FIG. 10 summarizes the parameters used in the simulations.

Figures 6A, 6B:
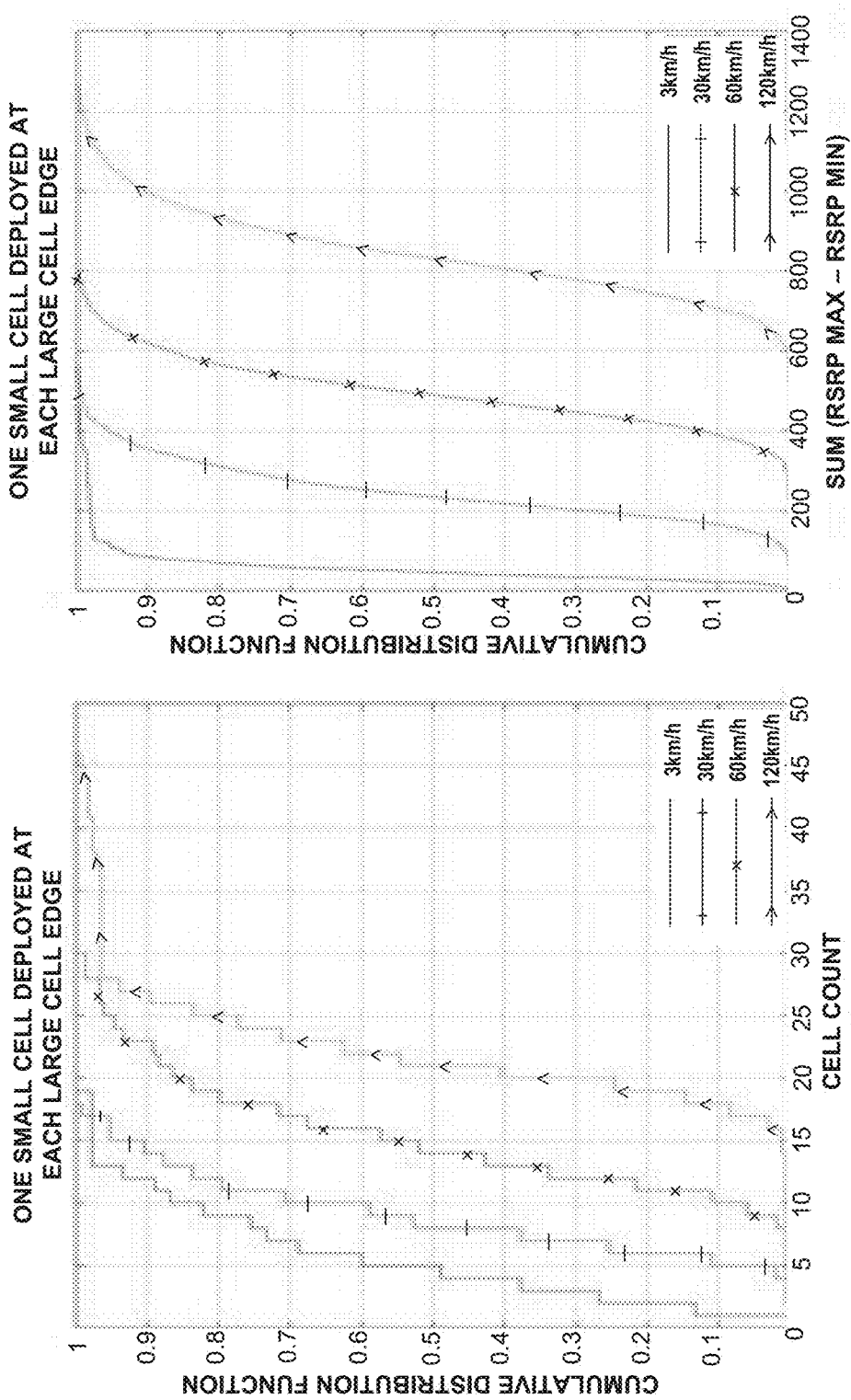
FIG. 6A illustrates a graph of a Cumulative Distribution Function (CDF) vs. cell count in a cellular network with one small cell deployed at each edge of a large cell.
FIG. 6B illustrates a graph of a CDF vs. the sum of the differences of RSRP maximum and RSRP minimum values calculated by a UE in a cellular network with one small cell deployed at each edge of a large cell.

FIG. 6A illustrates a graph of a Cumulative Distribution Function (CDF) vs. cell count in a cellular network with one small cell deployed at each large cell edge. FIG. 6B illustrates a graph of a CDF vs. the sum of the differences of RSRP maximum and RSRP minimum values calculated by a UE in a cellular network with one small cell deployed at each large cell edge. As can be seen by comparing the graphs, the vertical overlap between adjacent speed curves is greater in the graph of FIG. 6A than in the graph of FIG. 6B. This greater vertical overlap means that more error will occur using the algorithm simulated in FIG. 6A than in FIG. 6B. Vertical overlap, as used herein, means that for a given CELL COUNT or SUM (RSRP MAX−RSRP MIN) of a UE at one speed, another UE at another speed has the same cell count somewhere in the range of the CDF.

Figure 7B:
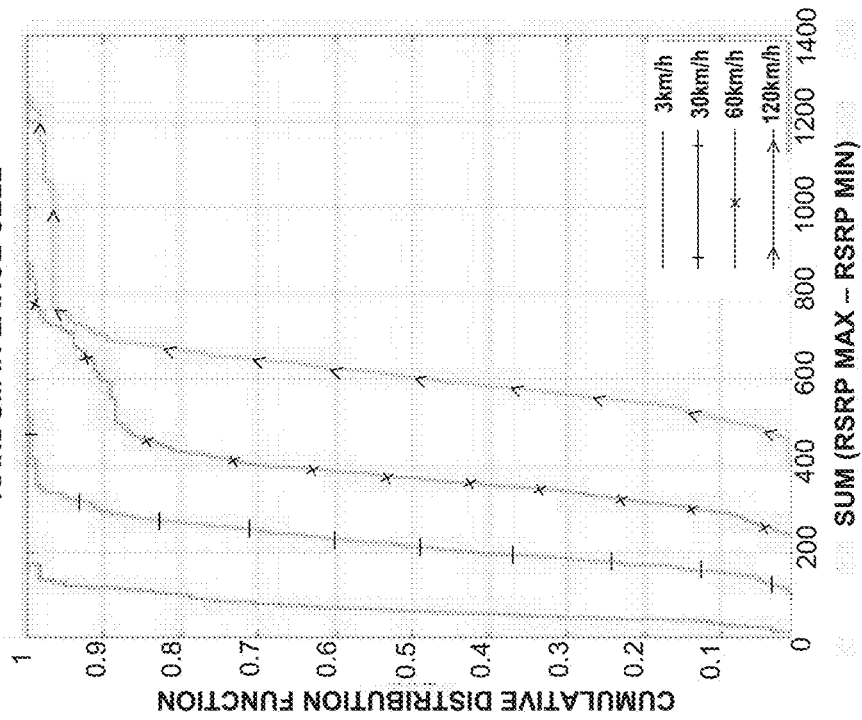
FIG. 7B illustrates a graph of a CDF vs. the sum of the differences of RSRP maximum and RSRP minimum values calculated by a UE in a cellular network with one small cell deployed at random within the coverage area of a large cell.
Figure 7A:
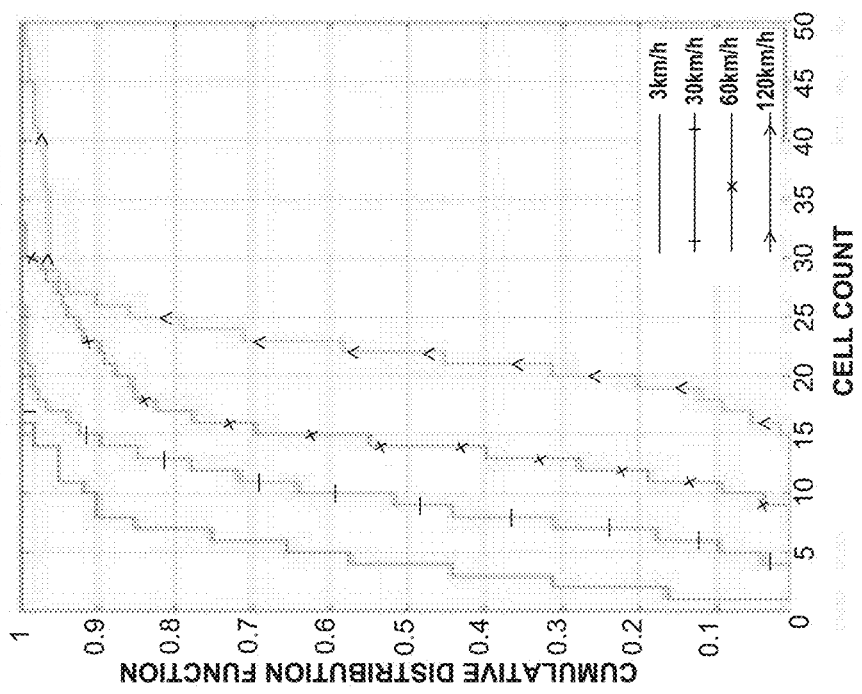
FIG. 7A illustrates a graph of a CDF vs. cell count calculated by a UE in a cellular network with one small cell deployed at random within the coverage area of a large cell.

FIG. 7A illustrates a graph of a CDF vs. cell count calculated by a UE in a cellular network with one small cell deployed at random in a large cell. FIG. 7B illustrates a graph of a CDF vs. the sum of the differences of RSRP maximum and RSRP minimum values calculated by a UE in a cellular network with one small cell deployed at random in a large cell. As can be seen, FIG. 7B exhibits less vertical overlap between different speed curves than the speed curves of FIG. 7A.

Figures 8A, 8B:
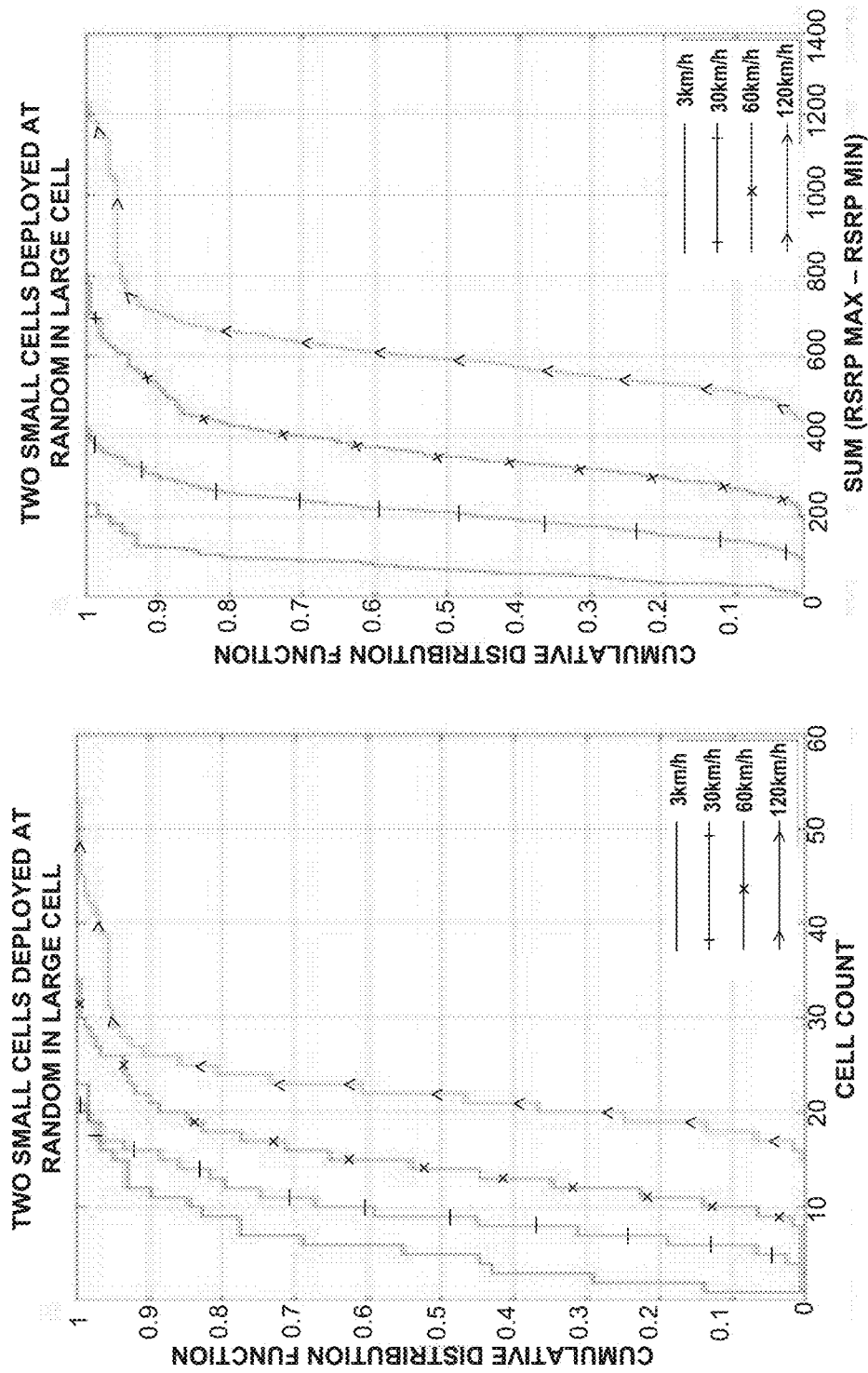
FIG. 8A illustrates a graph of a CDF vs. cell count calculated by a UE in a cellular network with two small cells deployed at random within the coverage area of a large cell.
FIG. 8B illustrates a graph of a CDF vs. the sum of the differences of RSRP maximum and RSRP minimum values calculated by a UE in a cellular network with two small cells deployed at random within the coverage area of a large cell.

FIG. 8A illustrates a graph of a CDF vs. cell count calculated by a UE in a cellular network with two small cells deployed at random in a large cell. FIG. 8B illustrates a graph of a CDF vs. the sum of the differences of RSRP maximum and RSRP minimum values calculated by a UE in a cellular network with two small cells deployed at random in a large cell. As can be seen, FIG. 8B exhibits less vertical overlap between different speed curves than the speed curves of FIG. 8A.

FIG. 9A illustrates a graph of a CDF vs. cell count calculated by a UE in a cellular network with four small cells deployed at random in a large cell. FIG. 9B illustrates a graph of a CDF vs. the sum of the differences of RSRP maximum and RSRP minimum values calculated by a UE in a cellular network with four small cells deployed at random in a large cell. As can be seen, FIG. 9B exhibits less vertical overlap between different speed curves than the speed curves of FIG. 9A.

In addition to the parameters presented in FIG. 10, some of the simulation results compare three different MSE algorithms in different network configuration. In the first MSE algorithm, large and small cells are each counted as one cell count, in the second MSE algorithm only large cells are counted and small cells are ignored or multiplied by a weighting factor of zero before they are summed; and in the third MSE algorithm the following weighting factors were used: 1) a weighting factor of one is used when the UE interacts with a second large cell after interacting with a first large cell; 2) a weighting factor of 0.3 is used when the UE interacts with a small cell after interacting with a large cell, or vice versa; and 3) a weighting factor of 0.15 is used when the UE interacts with a second small cell after interacting with a first small cell.

Figure 11:
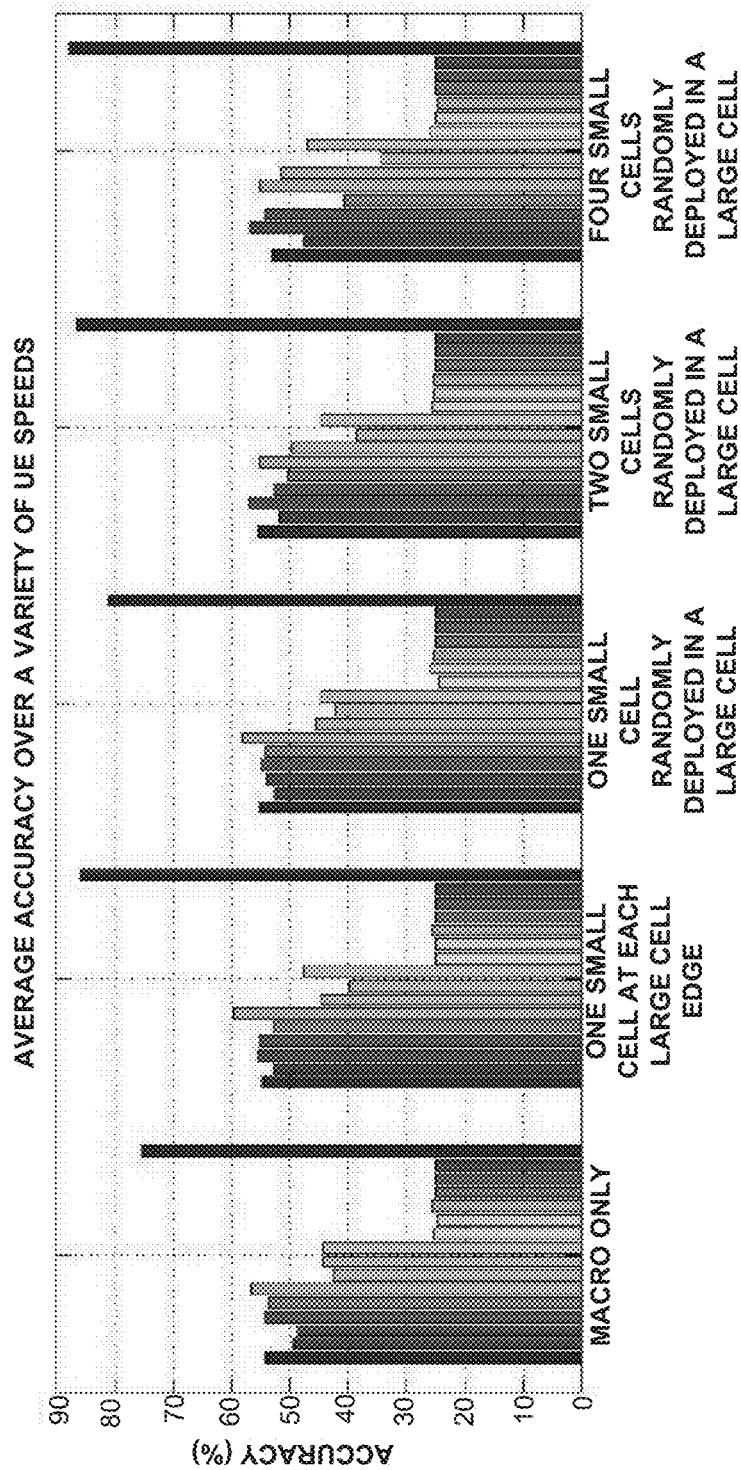
FIG. 11 illustrates a bar graph comparing the average accuracy of various MSE methods used in various different network configurations and over a variety of UE speeds.

FIG. 11 illustrates a bar graph comparing the average accuracy of various MSE methods used in various different network configuration and over a variety of UE speeds. The variety of UE speeds in the example graph shown in FIG. 12 includes 3, 30, 60, and 120 km/h. The bars in each set of bar graphs depict the following simulation parameters from left to right: every cell has a cell count of one with parameters valued as in column "A" of the table in FIG. 10; only large cells are counted in the cell count with parameters valued as in column "A" of the table in FIG. 10; large and small cells are weighted as described in the preceding paragraph with parameters valued as in column "A" of the table in FIG. 10; every cell has a cell count of one with parameters valued as in column "B" of the table in FIG. 10; only large cells are counted in the cell count with parameters valued as in column "B" of the table in FIG. 10; large and small cells are weighted as described in the preceding paragraph with parameters valued as in column "B" of the table in FIG. 10; every cell has a cell count of one with parameters valued as in column "C" of the table in FIG. 10; only large cells are counted in the cell count with parameters valued as in column "C" of the table in FIG. 10; large and small cells are weighted as described in the preceding paragraph with parameters valued as in column "C" of the table in FIG. 10; every cell has a cell count of one with parameters valued as in column "D" of the table in FIG. 10; only large cells are counted in the cell count with parameters valued as in column "D" of the table in FIG. 10; large and small cells are weighted as described in the preceding paragraph with parameters valued as in column "D" of the table in FIG. 10; every cell has a cell count of one with parameters valued as in column "E" of the table in FIG. 10; only large cells are counted in the cell count with parameters valued as in column "E" of the table in FIG. 10; large and small cells are weighted as described in the preceding paragraph with parameters valued as in column "E" of the table in FIG. 10; and an MSE algorithm that determines a sum of the differences between a maximum RSRP and a minimum RSRP observed by a UE in each cell the UE interacts with.

As can be seen in FIG. 11, determining an MSE as a function of RSRP is more accurate than any of the other methods simulated and for all network configurations shown. The simulations showed a 75 percent or better accuracy in determining the mobility state of the UE in all network configurations, with most of the simulations having an MSE accuracy of greater than 80%. The best accuracy achieved in all other simulated network configurations achieves at best a 60% MSE accuracy.

Figure 12:
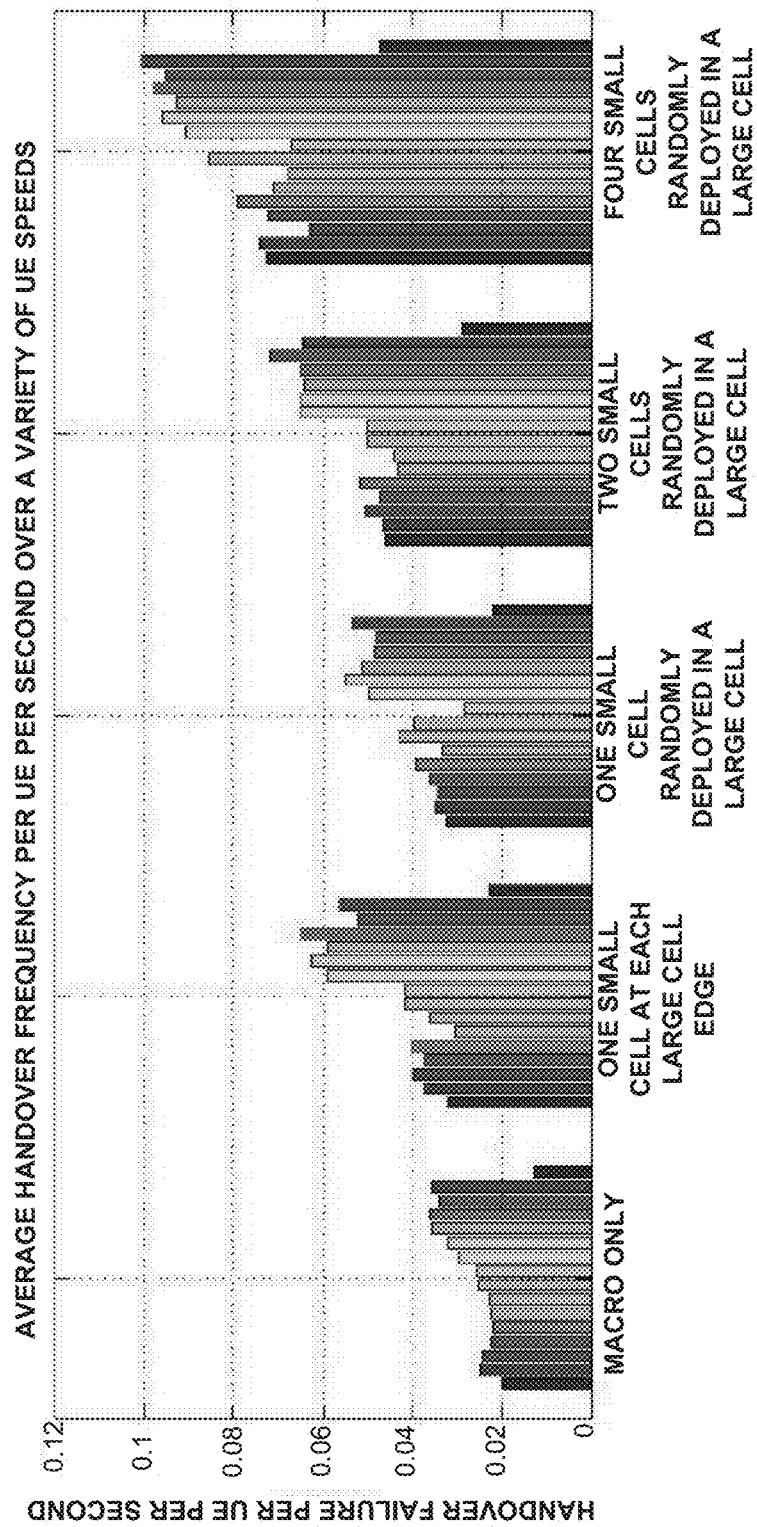
FIG. 12 illustrates a bar graph comparing the average handover frequency per UE per second of various MSE methods used in various different network configurations and over a variety of UE speeds.

FIG. 12 illustrates a bar graph comparing the average HandOver Failure (HOF) per UE per second of various MSE methods used in various different network configuration and over a variety of UE speeds. The variety of UE speeds in the example graph shown in FIG. 12 includes 3, 30, 60, and 120 km/h. The bars in this graph represent the same MSE algorithms and parameters as shown and described in FIG. 11. As can be seen, the average HOF per UE per second is lowest in the MSE algorithm that is determined as a function of the difference between the maximum RSRP and the minimum RSRP.

Figure 13:
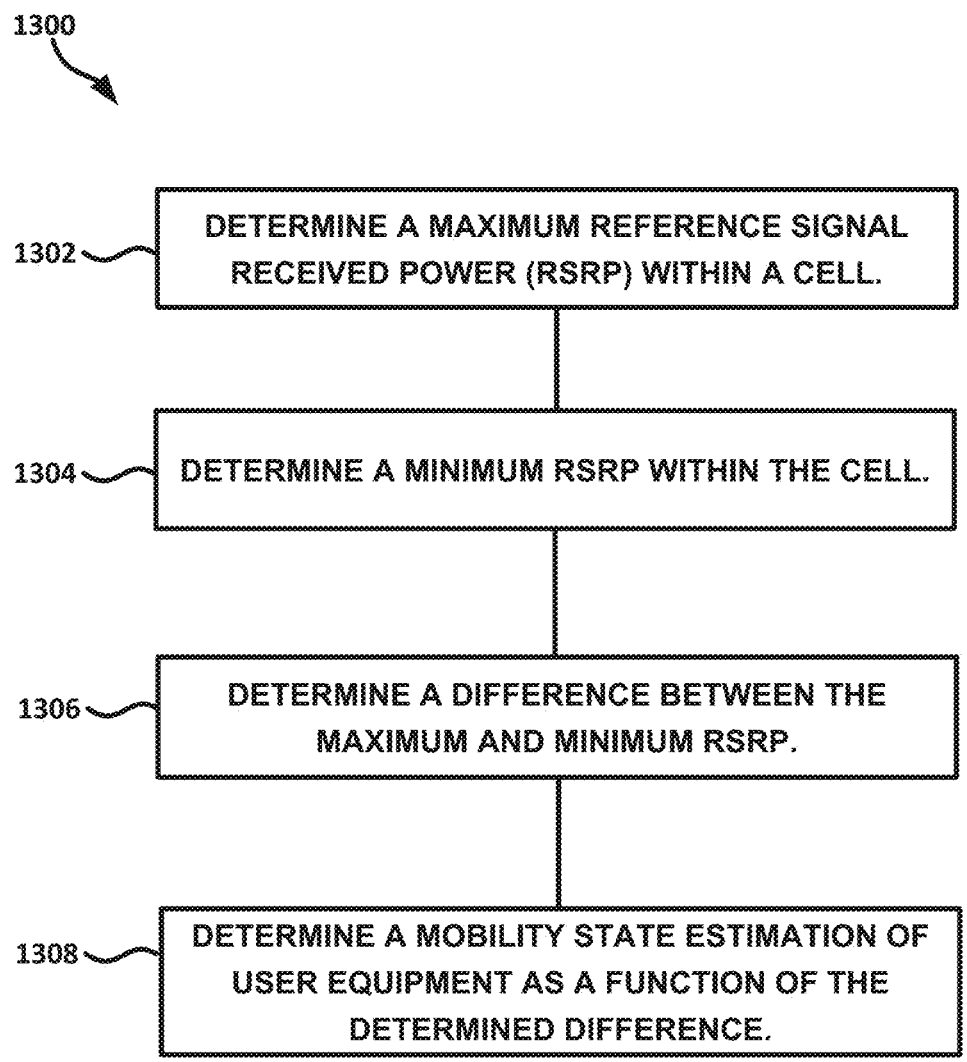
FIG. 13 illustrates an example of a technique for MSE using RSRP.

FIG. 13 illustrates a flow diagram of an example of a technique 1300 for determining an MSE of a UE 104. At 1302, a maximum RSRP observed by a UE 104 within a cell 102 can be determined. At 1304, a minimum RSRP within the cell 102 can be determined by the UE 104. At 1306, a difference between the maximum and minimum RSRP can be determined. At 1308, an MSE can be determined as a function of the determined difference.

The method 1300 can include determining if the determined difference is greater than a predetermined first threshold. If the MSE is greater than the predetermined first threshold then it can be determined that the UE 104 is in a high mobility state. If the MSE is less than or equal to the first threshold then it can be determined that the UE 104 is in a normal mobility state. The MSE can be compared to more than one threshold so as to delineate more mobility states. For example, the MSE can be compared to a predetermined second threshold to determine if the MSE is greater than the second threshold. The second threshold can be less than the first threshold. If the MSE is greater than the first and second thresholds, the UE 104 can be determined to be in high mobility state. If the MSE is greater than the second threshold, but less than or equal to the first threshold the UE 104 can be determined to be in a medium mobility state. If the MSE is less than or equal to the second threshold the UE 104 can be determined to be in a normal mobility state.

The method 1300 can include weighting the determined difference. The weight can be transmitted to and received by the UE 104 from a base station. The weight can be determined as a function of a path loss or a cell size of the respective cell 102. The received weight can be multiplied by the determined difference, and the MSE can be determined as a function of the RSRP weighted difference.

The method 1300 can include looking up the determined RSRP difference in a table so as to obtain a substitute RSRP value. The MSE can be determined as a function of the substitute RSRP value. In one or more embodiments, the substitute RSRP value can be multiplied by a weight received from a base station (e.g., eNodeB).

The method 1300 can include determining a maximum RSRP for each cell in a plurality of cells 102A and 102B that the UE 104 interacted with in a specified time period (e.g., $T_{Eval}$). A minimum RSRP can be determined for the cells 102A and 102B the UE 104 interacted with in the specified time period. A difference between the maximum and minimum RSRP for each cell 102 the UE 104 interacted with in the specified time period can be determined. The determined differences that were determined in the specified time period can be summed and the MSE can be determined as a function of the sum (e.g., the MSE can be equal to the sum, or the sum can be looked up in a table to obtain a substitute sum, or the sum or substitute sum could be weighted, or the RSRP determined differences that were summed could be weighted before they are added to the sum, etc.).

Figure 14:
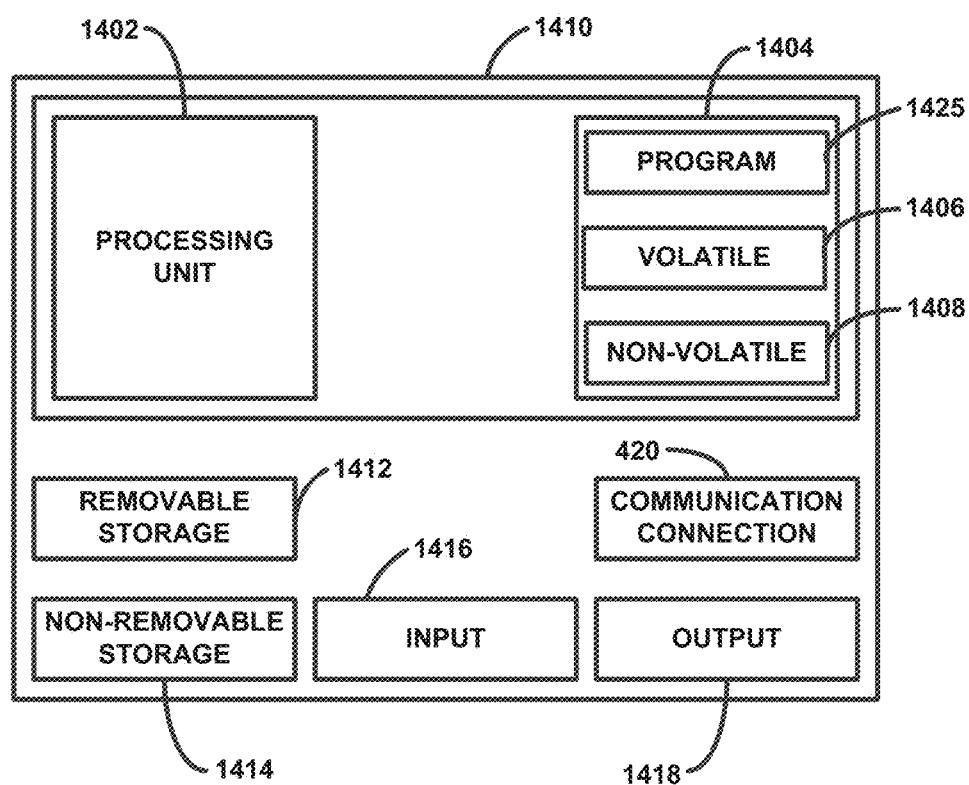
FIG. 14 is a schematic of an example of an electronic system, such as a UE.

FIG. 14 is a block diagram of a computing device, according to an example embodiment. One or more of the foregoing examples of UEs 104 that is configured to implement an MSE algorithm, may include a computing system, such as computing system 1400 of FIG. 14. In one or more embodiments, multiple such computer systems are utilized in a distributed network to implement multiple components in a transaction based environment. An object-oriented, service-oriented, or other architecture may be used to implement such functions and communicate between the multiple systems and components. One example computing device in the form of a computer 1410 may include a processing unit 1402, memory 1404, removable storage 1412, and non-removable storage 1414. Memory 1404 may include volatile memory 1406 and non-volatile memory 1408. Computer 1410 may include—or have access to a computing environment that includes—a variety of computer-readable media, such as volatile memory 1406 and non-volatile memory 1408, removable storage 1412 and non-removable storage 1414. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 1410 may include or have access to a computing environment that includes input 1416, output 1418, and a communication connection 1420. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a machine-readable storage device are executable by the processing unit 1402 of the computer 1410. A hard drive, CD-ROM, and RAM are some examples of articles including a non-transitory computer-readable medium. For example, a computer program 1425 capable of providing instructions, which when executed by the processing unit 1402 or other machine capable of executing the instructions, cause the processing unit to perform an MSE algorithm as described herein. The instructions can be saved on a CD-ROM and loaded from the CD-ROM to a hard drive of the computer 1410. The computer-readable instructions can allow the computer 1410 (e.g., the processing unit 1402) to implement the MSE algorithm.

EXAMPLES AND NOTES

The present subject matter may be described by way of several examples.

Example 1 can include subject matter (such as a system, apparatus, method, tangible machine readable medium, etc.) that can include a UE including a memory including instructions stored thereon, and a processor configured to execute the instructions, wherein the instructions, which when executed by the processor, cause the processor to perform operations including determining a maximum RSRP within a cell, determining a minimum RSRP within the cell, determining a difference between the maximum and minimum RSRP, and determining an MSE of the UE as a function of the determined difference.

In Example 2, the memory of Example 1 can further include instructions, which when executed by the processor, cause the processor to perform operations including determining if the determined difference is greater than a predetermined first threshold, in response to determining the determined difference is greater than the first threshold, determining the MSE of the UE is a high mobility, and in response to determining the determined difference is not greater than the first threshold, determining the MSE of the UE is a normal mobility.

In Example 3, the memory of at least one of Examples 1-2 can further include instructions, which when executed by the processor, cause the processor to perform operations including determining if the determined difference is greater than a predetermined second threshold, wherein the second threshold is less than the first threshold, in response to determining the determined difference is greater than the second threshold and the determined difference is not greater than the first threshold, determining the MSE of the UE is a medium mobility, and wherein the instructions for determining the MSE of the UE is a normal mobility, further include instructions for, in response to determining the determined difference is not greater than the second threshold, determining the MSE of the UE is a normal mobility.

In Example 4, the memory of at least one of Examples 1-3 can further include instructions, which when executed by the processor, cause the processor to perform operations including receiving a specified weight from an eNodeB of the cell, the specified weight determined as function of at least one chosen from the group consisting of a path loss and a size of the cell, and multiplying the determined difference by a specified weight to produce an RSRP weighted difference, and wherein the instructions for determining the MSE of the UE include instructions for determining the MSE as a function of the RSRP weighted difference.

In Example 5, the instructions of at least one of Examples 1-4 for: 1) determining if the determined difference is greater than the first threshold include instructions for determining if the RSRP weighted difference is greater than the first threshold, 2) determining the MSE of the UE is a high mobility include instructions for, in response to determining the RSRP weighted difference is greater than the first threshold, determining the MSE of the UE is a high mobility, and 3) determining the MSE of the UE is a normal mobility, include instructions for, in response to determining the RSRP weighted difference is not greater than the first threshold, determining the MSE of the UE is a normal mobility.

In Example 6, the instructions of at least one of Examples 1-5 for: 1) determining if the determined difference is greater than a predetermined second threshold include instructions for determining if the RSRP weighted difference is greater than the second threshold, 2) determining the MSE of the UE is a high mobility include instructions for, in response to determining the RSRP weighted difference is greater than the second threshold and the RSRP weighted difference is not greater than the first threshold, determining the MSE of the UE is a medium mobility, and determining the MSE of the UE is a normal mobility, include instructions for, in response to determining the RSRP weighted difference is not greater than the second threshold, determining the MSE of the UE is a normal mobility.

In Example 7, the memory of at least one of Examples 1-6 can further include instructions, which when executed by the processor, cause the processor to perform operations including looking up the determined RSRP difference in a table to obtain a corresponding substitute RSRP value, and wherein the instructions for determining an MSE of the UE as a function of the determined difference include instructions for determining the MSE as a function of the substitute RSRP value.

In Example 8, the memory of at least one of Examples 1-7 can further include instructions, which when executed by the processor, cause the processor to perform operations including receiving a specified weight from an eNodeB of the cell, the specified weight determined as function of at least one chosen from the group consisting of a path loss and a size of the cell, and multiplying the substitute RSRP value by a specified weight to produce an RSRP weighted difference, and wherein the instructions for determining the MSE of the UE include instructions for determining the MSE as a function of the RSRP weighted difference.

In Example 9, the instructions of at least one of Examples 1-8 for: 1) determining a maximum Reference Signal Received Power (RSRP) within the cell include instructions for determining the maximum RSRP for each cell in a plurality of cells that the UE interacted with in a specified time period, 2) determining a minimum RSRP within the cell include instructions for determining the minimum RSRP for the cells the UE interacted with in the specified time period, 3) determining a difference between the maximum and minimum RSRP include instructions for determining a difference between the maximum and minimum RSRP for each cell the UE interacted with in the specified time period, and 4) determining an MSE of the UE as a function of the determined difference include instructions for summing the determined differences between the maximum and minimum RSRP.

In Example 10, a method for determining an MSE of a UE can include determining, using the UE, a maximum Reference Signal Received Power (RSRP) within a cell, determining, using the UE, a minimum RSRP within the cell, determining, using the UE, a difference between the maximum and minimum RSRP, and determining, using the UE, an MSE of the UE as a function of the determined difference.

In Example 11, the method of at least one of Examples 1-10 can include determining, using the UE, if the determined difference is greater than a predetermined first threshold, in response to determining the determined difference is greater than the first threshold, determining, using the UE, the MSE of the UE is a high mobility, and in response to determining the determined difference is not greater than the first threshold, determining, using the UE, the MSE of the UE is a normal mobility.

In Example 12, the method of at least one of Examples 1-11 can include determining if the determined difference is greater than a predetermined second threshold, wherein the second threshold is less than the first threshold, and in response to determining the determined difference is greater than the second threshold and the determined difference is not greater than the first threshold, determining the MSE of the UE is a medium mobility, and wherein determining the MSE of the UE is a normal mobility, further includes, in response to determining the determined difference is not greater than the second threshold, determining the MSE of the UE is a normal mobility.

In Example 13, the method of at least one of Examples 1-12 can include receiving a specified weight from an eNodeB of the cell, the specified weight determined as function of at least one chosen from the group consisting of a path loss and a size of the cell, and multiplying the determined difference by a specified weight to produce an RSRP weighted difference, and wherein determining the MSE of the UE includes determining the MSE as a function of the RSRP weighted difference.

In Example 14, the method of at least one of Examples 1-13 can include wherein determining if the determined difference is greater than a predetermined first threshold includes determining if the RSRP weighted difference is greater than the first threshold, determining the MSE of the UE is a high mobility includes, in response to determining the RSRP Weighted difference is greater than the first threshold, determining the MSE of the UE is a high mobility, and determining the MSE of the UE is a normal mobility includes, in response to determining the RSRP weighted difference is not greater than the first threshold, determining the MSE of the UE is a normal mobility.

In Example 15, the method of at least one of Examples 1-14 can include wherein determining if the determined difference is greater than a predetermined second threshold includes determining if the RSRP weighted difference is greater than the second threshold, determining the MSE of the UE is a high mobility includes, in response to determining the RSRP weighted difference is greater than the second threshold and the RSRP weighted difference is not greater than the first threshold, determining the MSE of the UE is a medium mobility, and determining the MSE of the UE is a normal mobility includes, in response to determining the RSRP weighted difference is not greater than the second threshold, determining the MSE of the UE is a normal mobility.

In Example 16, the method of at least one of Examples 1-15 can further include looking up the determined RSRP difference in a table to obtain a substitute RSRP value, and wherein determining an MSE of the UE as a function of the determined difference includes determining the MSE as a function of the substitute RSRP value.

In Example 17, the method of at least one of Examples 1-16 can include receiving a specified weight from an eNodeB of the cell, the specified weight determined as function of at least one chosen from the group consisting of a path loss and a size of the cell, multiplying the substitute RSRP value by a specified weight to produce an RSRP weighted difference, and wherein determining the MSE of the UE includes determining the MSE as a function of the RSRP weighted difference.

In Example 18, the method of at least one of Examples 1-17 can include wherein determining a maximum Reference Signal Received Power (RSRP) within the cell includes determining a maximum RSRP for each cell in a plurality of cells that the UE interacted with in a specified time period, determining a minimum RSRP within the cell includes determining the minimum RSRP for the cells the UE interacted with in the specified time period, determining a difference between the maximum and minimum RSRP includes determining a difference between the maximum and minimum RSRP for each cell the UE interacted with in the specified time period, and determining an MSE of the UE as a function of the determined difference includes summing the determined differences between the maximum and minimum RSRPs.

In Example 19 a non-transitory computer readable storage device can include instructions stored thereon, the instructions, which when executed by a machine, cause the machine to perform operations including: determining a maximum Reference Signal Received Power (RSRP) within a cell, determining a minimum RSRP within the cell, determining a difference between the maximum and minimum RSRP, and determining an MSE as a function of the determined difference.

In Example 20, the storage device of at least one of Examples 1-19 can include instructions stored thereon, which when executed by the machine, cause the machine to further perform operations including determining if the determined difference is greater than a predetermined first threshold, in response to determining the determined difference is greater than the first threshold, determining the MSE is a high mobility, and in response to determining the determined difference is not greater than the first threshold the MSE is a normal mobility.

In Example 21 the storage device of at least one of Examples 1-20 can further include instructions stored thereon, which when executed by the machine, cause the machine to further perform operations including determining if the determined difference is greater than a predetermined second threshold, wherein the second threshold is less than the first threshold, and in response to determining the determined difference is greater than the second threshold and the determined difference is not greater than the first threshold, determining the MSE is a medium mobility, and wherein the instructions for determining the MSE is a normal mobility, further include instructions for, in response to determining the determined difference is not greater than the second threshold, determining the MSE is a normal mobility.

In Example 22, the storage device of at least one of Examples 1-21 can further include instructions stored thereon, which when executed by the machine, cause the machine to further perform operations including receiving a specified weight from an eNodeB of the cell, the specified weight determined as function of at least one chosen from the group consisting of a path loss and a size of the cell, and multiplying the determined difference by a specified weight to produce an RSRP weighted difference, and wherein the instructions for determining the MSE include instructions for determining the MSE as a function of the RSRP weighted difference.

In Example 23, the storage device of at least one of Examples 1-22 can further include instructions, which when executed by the machine, cause the machine to further perform operations including looking up the determined RSRP difference in a table to obtain a substitute RSRP value, and wherein the instructions for determining an MSE as a function of the determined difference include instructions for determining the MSE as a function of the substitute RSRP value.

In Example 24, the storage device of at least one of Examples 1-23 further includes instructions stored thereon, which when executed by the machine, cause the machine to further perform operations including receiving a specified weight from an eNodeB of the cell, the specified weight determined as function of at least one chosen from the group consisting of a path loss and a size of the cell, and multiplying the substitute RSRP value by a specified weight to produce an RSRP weighted difference, and wherein the instructions for determining the MSE include instructions for determining the MSE as a function of the RSRP weighted difference.

In Example 25, the storage device of at least one of Examples 1-24 wherein the instructions for determining a maximum Reference Signal Received Power (RSRP) within the cell can include instructions for determining a maximum RSRP for each cell in a plurality of cells that the machine interacted with in a specified time period, determining a minimum RSRP within the cell include instructions for determining the minimum RSRP for the cells the machine interacted with in the specified time period, determining a difference between the maximum and minimum RSRP include instructions for determining a difference between the maximum and minimum RSRP for each cell the machine interacted with in the specified time period, and determining an MSE as a function of the determined difference include instructions for summing the determined differences between the maximum and minimum RSRPs.

The above detailed description includes references to the accompanying drawings, which form a part of the detailed description. The drawings show, by way of illustration, specific embodiments in which methods, apparatuses, and systems discussed herein can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one, or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A User Equipment (UE) comprising:
   a memory including instructions stored thereon, and
   a processor configured to execute the instructions, wherein the instructions, which when executed by the processor, cause the processor to perform operations to:
   receive a specified weight from an eNodeB of a first cell, the specified weight based on at least one chosen from the group consisting of a path loss and a size of the cell;
   determine a maximum Reference Signal Received Power (RSRP) within the first cell;
   determine a minimum RSRP within the first cell;
   determine a difference between the maximum and minimum RSRP;
   multiply the determined difference by the specified weight to produce an RSRP weighted difference;
   determine a Mobility State Estimation (MSE) of the UE as a function of the RSRP weighted difference; and
   initiate a handover to a second cell at a time determined based on the determined MSE, wherein executing the handover occurs at an earlier time in response to determining the MSE of the UE is a high mobility state as compared to determining the MSE of the UE is a normal or low mobility state.

2. The UE of claim 1, wherein the memory further includes instructions, which when executed by the processor, cause the processor to perform operations to:
   determine if the RSRP weighted difference is greater than a predetermined first threshold;
   in response to determining the RSRP weighted difference is greater than the first threshold, determine the MSE of the UE is a high mobility; and
   in response to determining the RSRP weighted difference is not greater than the first threshold, determine the MSE of the UE is a normal mobility.

3. The UE of claim 2, wherein the memory further includes instructions, which when executed by the processor, cause the processor to perform operations to:
   determine if the RSRP weighted difference is greater than a predetermined second threshold, wherein the second threshold is less than the first threshold; and
   in response to determining the RSRP weighted difference is greater than the second threshold and the determined difference is not greater than the first threshold, determine the MSE of the UE is a medium mobility; and
   wherein the instructions for determining the MSE of the UE is a normal mobility, further include instructions for, in response to determining the RSRP weighted difference is not greater than the second threshold, determine the MSE of the UE is a normal mobility.

4. The UE of claim 1, wherein the memory further includes instructions, which when executed by the processor, cause the processor to perform operations to:
   look up the determined RSRP difference in a table to obtain a corresponding substitute RSRP value; and
   wherein the instructions for determining an MSE of the UE as a function of the determined difference include instructions for determining the MSE as a function of the substitute RSRP value.

5. The UE of claim 4, wherein the memory further includes instructions, which when executed by the processor, cause the processor to perform operations to:
   multiply the substitute RSRP value by the specified weight to produce the RSRP weighted difference.

6. The UE of claim 1, wherein the maximum RSRP of the first cell is a first maximum RSRP, the minimum RSRP of the first cell is a first minimum RSRP, the difference between maximum and the minimum RSRP is a first difference, and the RSRP weighted difference is a first RSRP weighted difference, and the memory further includes instructions, which when executed by the processor, cause the processor to perform operations to:
   determine a second maximum Reference Signal Received Power (RSRP) within a third cell;
   determine a second minimum RSRP within the third cell;
   determine a second difference between the second maximum and the second minimum RSRP;
   multiply the second difference by another specified weight to create a second RSRP weighted difference; and
   sum the first RSRP weighted difference and the second RSRP weighted difference to create an RSRP weighted difference total;
   wherein the instructions for determining the MSE of the UE include instructions for determining the MSE as a function of the RSRP weighted difference total.

7. The UE of claim 1, wherein the maximum RSRP of the first cell is a first maximum RSRP, the minimum RSRP of the first cell is a first minimum RSRP, and the difference between maximum and the minimum RSRP is a first difference, and the memory further includes instructions, which when executed by the processor, cause the processor to perform operations to:
   determine a second maximum Reference Signal Received Power (RSRP) within a third cell;
   determine a second minimum RSRP within the third cell;
   determine a second difference between the second maximum and the second minimum RSRP;

look up a first value in a look up table based on the first difference, the look up table organized according to cell size and RSRP difference, wherein a range of RSRP differences map to a single value in the look up table;

wherein the instructions for multiplying the first difference by the specified weight include multiplying the first value by the specified weight to produce a first weighted value;

look up a second value in the look up table based on the second difference;

multiply the second value by a another specified weight to produce a second weighted value;

sum the first weighted value and the second weighted value to create an RSRP weighted value total; and wherein the instructions for determining the MSE of the UE include instructions for determining the MSE as a function of the RSRP weighted value total.

8. The UE of claim 1, wherein the maximum RSRP of the first cell is a first maximum RSRP, the minimum RSRP of the first cell is a first minimum RSRP, and the difference between maximum and the minimum RSRP is a first different, and the memory further includes instructions, which when executed by the processor, cause the processor to perform operations to:

compare the first difference to a first threshold value and setting a first weight to a first specified value in response to determining the first difference is less than the first threshold value;

in response to determining the first difference is greater than the first threshold, compare the first difference to a second threshold value greater than the first threshold value, and setting the first weight to a second specified value greater than the first specified value in response to determining the first difference is less than the second threshold value;

in response to determining the first difference is greater than the second threshold value, set the first weight to a third specified value greater than the second specified value;

determine a second maximum RSRP within a third cell;

determine a second minimum RSRP within the third cell;

determine a second difference between the second maximum and the second minimum RSRP;

compare the second difference to the first threshold value and setting a second weight to the first specified value in response to determining the first difference is less than the first threshold value;

in response to determining the second difference is greater than the first threshold, compare the second difference to the second threshold value, and set the second weight to the second specified value in response to determining the second difference is less than the second threshold value;

in response to determining the second difference is greater than the second threshold value, set the second weight to a third specified value;

sum the first and second weights; and wherein the instructions for determining the MSE of the UE include instructions for determining the MSE as a function of the summed weights.

9. A method for determining a Mobility State Estimation (MSE) of a User Equipment (UE), the method comprising:

receiving, at the UE, a specified weight from an eNodeB of a first cell, the specified weight determined as function of at least one chosen from the group consisting of a path loss and a size of the cell;

determining, using the UE, a maximum Reference Signal Received Power (RSRP) within a first cell;

determining, using the UE, a minimum RSRP within the first cell;

determining, using the UE, a difference between the maximum and minimum RSRP;

multiplying the determined difference by the specified weight to produce an RSRP weighted difference;

determining, using the UE, an MSE of the UE as a function of the RSRP weighted difference; and initiating a handover to a second cell at a time determined based on the determined MSE, wherein executing the handover occurs at an earlier time in response to determining the MSE of the UE is a high mobility state as compared to determining the MSE of the UE is a normal or low mobility state.

10. The method of claim 9, further comprising:

determining, using the UE, if the RSRP weighted difference is greater than a predetermined first threshold;

in response to determining the RSRP weighted difference is greater than the first threshold, determining, using the UE, the MSE of the UE is a high mobility; and in response to determining the RSRP weighted difference is not greater than the first threshold, determining, using the UE, the MSE of the UE is a normal mobility.

11. The method of claim 10, further comprising:

determining if the RSRP weighted difference is greater than a predetermined second threshold, wherein the second threshold is less than the first threshold; and in response to determining the RSRP weighted difference is greater than the second threshold and the determined difference is not greater than the first threshold, determining the MSE of the UE is a medium mobility; and wherein determining the MSE of the UE is a normal mobility, further includes, in response to determining the RSRP weighted difference is not greater than the second threshold, determining the MSE of the UE is a normal mobility.

12. The method of claim 9, further comprising looking up the determined RSRP difference in a table to obtain a substitute RSRP value; and wherein determining an MSE of the UE as a function of the RSRP weighted difference includes determining the MSE as a function of the substitute RSRP value.

13. The method of claim 12, further comprising:

multiplying the substitute RSRP value by the specified weight to produce the RSRP weighted difference.

14. A non-transitory computer readable storage device comprising instructions stored thereon, the instructions, which when executed by a machine, cause the machine to perform operations to:

receive a specified weight from an eNodeB of a first cell, the specified weight based on at least one chosen from the group consisting of a path loss and a size of the cell;

determine a maximum Reference Signal Received Power (RSRP) within a first cell;

determine a minimum RSRP within the first cell;

determine a difference between the maximum and minimum RSRP;

multiply the determined difference by the specified weight to produce an RSRP weighted difference;

determine a Mobility State Estimation (MSE) as a function of the RSRP weighted difference; and initiate a handover to a second cell at a time determined based on the determined MSE, wherein executing the handover occurs at an earlier time in response to determining the MSE of the UE is a high mobility state as compared to determining the MSE of the UE is a normal or low mobility state.

15. The storage device of claim 14, further comprising instructions stored thereon, which when executed by the machine, cause the machine to further perform operations to:
   determine if the RSRP weighted difference is greater than a predetermined first threshold;
   in response to determining the RSRP weighted difference is greater than the first threshold determine the MSE is a high mobility; and
   in response to determining the RSRP weighted difference is not greater than the first threshold determine the MSE is a normal mobility.

16. The storage device of claim 15, further comprising instructions stored thereon, which when executed by the machine, cause the machine to further perform operations to:
   determine if the RSRP weighted difference is greater than a predetermined second threshold, wherein the second threshold is less than the first threshold; and
   in response to determining the RSRP weighted difference is greater than the second threshold and the determined difference is not greater than the first threshold, determine the MSE is a medium mobility; and
   wherein the instructions for determining the MSE is a normal mobility, further include instructions for, in response to determining the RSRP weighted difference is not greater than the second threshold, determine the MSE is a normal mobility.

17. The storage device of claim 16, further comprising instructions stored thereon, which when executed by the machine, cause the machine to further perform operations to:
   look up the determined RSRP difference in a table to obtain a substitute RSRP value; and
   wherein the instructions for determining an MSE as a function of the determined difference include instructions for determining the MSE as a function of the substitute RSRP value.

18. A system comprising:
   an antenna;
   a radio transceiver communicatively coupled to the antenna; and
   a User Equipment (UE) comprising:
      a memory including instructions stored thereon, and
      a processor configured to execute the instructions, wherein the instructions, which when executed by the processor, cause the processor to perform operations to:
         receive a specified weight from an eNodeB of a first cell, the specified weight based on at least one chosen from the group consisting of a path loss and a size of the cell;
         determine a maximum Reference Signal Received Power (RSRP) of a plurality of plurality of signals received within the first cell, each of the signals received through the antenna and the transceiver;
         determine a minimum RSRP within the cell of the plurality of signals received within the first cell;
         determine a difference between the maximum and minimum RSRP;
         multiply the determined difference by the specified weight to produce an RSRP weighted difference;
         determine a Mobility State Estimation (MSE) of the UE as a function of the RSRP weighted difference; and
         initiate a handover to a second cell at a time determined based on the determined MSE, wherein executing the handover occurs at an earlier time in response to determining the MSE of the UE is a high mobility state as compared to determining the MSE of the UE is a normal or low mobility state.

19. The system of claim 18, wherein the memory further includes instructions, which when executed by the processor, cause the processor to perform operations to:
   determine if the RSRP weighted difference is greater than a predetermined first threshold;
   in response to determining the RSRP weighted difference is greater than the first threshold, determine the MSE of the UE is a high mobility; and
   in response to determining the RSRP weighted difference is not greater than the first threshold, determine the MSE of the UE is a normal mobility.

20. The system of claim 19, wherein the memory further includes instructions, which when executed by the processor, cause the processor to perform operations to:
   determine if the RSRP weighted difference is greater than a predetermined second threshold, wherein the second threshold is less than the first threshold; and
   in response to determining the RSRP weighted difference is greater than the second threshold and the determined difference is not greater than the first threshold, determine the MSE of the UE is a medium mobility; and
   wherein the instructions for determining the MSE of the UE is a normal mobility, further include instructions for, in response to determining the RSRP weighted difference is not greater than the second threshold, determine the MSE of the UE is a normal mobility.

* * * * *